United States Patent
Cervone et al.

(10) Patent No.: US 7,620,499 B2
(45) Date of Patent: Nov. 17, 2009

(54) WAVELET MAXIMA CURVES OF SURFACE LATENT HEAT FLUX

(75) Inventors: Guido Cervone, Arlington, VA (US); Menas Kafatos, Fairfax Station, VA (US); Domenico Napoletani, Fairfax, VA (US); Ramesh P. Singh, Fairfax, VA (US)

(73) Assignee: George Mason Intellectual Properties, Inc., Fairfax, VA (US)

( * ) Notice: Subject to any disclaimer, the term of this patent is extended or adjusted under 35 U.S.C. 154(b) by 954 days.

(21) Appl. No.: 11/108,115

(22) Filed: Apr. 18, 2005

(65) Prior Publication Data

US 2005/0229508 A1  Oct. 20, 2005

Related U.S. Application Data

(60) Provisional application No. 60/562,535, filed on Apr. 16, 2004.

(51) Int. Cl.
*G01V 1/28* (2006.01)
(52) U.S. Cl. .......................................... 702/15; 324/300
(58) Field of Classification Search ................... 702/13, 702/14, 15, 34, 155; 324/300, 330
See application file for complete search history.

(56) References Cited

U.S. PATENT DOCUMENTS 5,270,649 A * 12/1993 Laukien ...................... 324/300
7,277,797 B1 * 10/2007 Kunitsyn et al. ............... 702/15

OTHER PUBLICATIONS

Yan et al., "Study of techniques of identifying the earthquake precursory anomalies in terms of mathematical modeling", Acta Seismologica Sinica, vol. 13, No. 6 / Nov. 2000, pp. 646-655.*

* cited by examiner

*Primary Examiner*—John H Le
(74) *Attorney, Agent, or Firm*—David Yee

(57) ABSTRACT

The present invention introduces an innovative data mining technique to identify precursory signals associated with earthquakes. It involves a multistrategy approach that employs one-dimensional wavelet transformations to identify singularities in data, and analyzes the continuity of wavelet maxima in time and space to determine the singularities that could be precursory signals. Surface Latent Heat Flux (SLHF) data may be used. A single prominent SLHF anomaly may be found to be associated some days prior to a main earthquake event.

12 Claims, 26 Drawing Sheets

WAVELET MAXIMA CURVES OF SURFACE LATENT HEAT FLUX

CROSS-REFERENCE TO RELATED APPLICATIONS

The present application claims the benefit of provisional patent application: Ser. No. 60/562,535 to Cervone et al., filed on Apr. 16, 2004, entitled "Wavelet Maxima Curves of Surface Latent Heat Flux Associated with the Greek Earthquake of 14 Aug. 2003," which is hereby incorporated by reference.

BACKGROUND OF THE INVENTION

Multisensor data available from airborne and spaceborne platforms have become widely used to study the changes of land, oceanic, atmospheric and ionospheric parameters, and their relation to various natural hazards. For example, significant changes prior to earthquake events have been observed in Surface Latent Heat Flux (SLHF), Sea Surface Temperature (SST), water vapor and chlorophyll concentration. Suggesting the presence of some interaction between the lithosphere and atmosphere, these observed changes have created an interest in using satellite-based observations to identify and study earthquake precursors.

Routine SLHF measurements can provide early warnings of an impending earthquake. With respect to coastal earthquakes, anomalous SLHF peaks appear to consistently occur a few days prior to the main earthquake event. The magnitude of each peak tends to vary, while SLHF tends to be higher over oceans and lower over land. The origin of anomalous SLHF peaks is likely to be related with the manifestations of the surface temperature in the epicentral region, which can be associated with the building up of stress and movement along faults.

It is believed that temperature increases prior to an earthquake. To show changes in temperature, infrared (IR) wavelengths from a Moderate Resolution Imaging Spectroradiometer (MODIS) sensor may be used. There may be various explanations, such as friction along a fault or fluid movement, as to why the temperature may rise. In addition, SST may also increase due to heat conduction. A rise in SST may cause ocean evaporation to increase, which in turn may raise anomalous SLHF peaks prior to a main earthquake.

Annually, SLHF contains a large number of maxima peaks, several of which are more than 1 or 2 times above the standard deviation. These peaks can be attributed to atmospheric phenomena, earthquakes or ocean disturbances. Problematically, it is difficult to identify the maximum SLHF peak as a precursor of an impending earthquake. The detection of the maximum SLHF peak is significant to alert and allow affected regions to prepare for an impending earthquake. For example, had the maximum SLHF peak of the earthquake that struck the Indian Ocean in Dec. 26, 2004 and caused the great tsunami disaster thereafter been detected, hundreds of thousands of people could have been forewarned and prepared for evacuation. Hence, what is needed is a general methodology and model to employ spatial and/or temporal analysis of wavelet maxima to identify signals associated with earthquakes with precise continuity in time and space.

Several commercial and research models have been developed for an early warning system that mainly uses past historical data, some of which can be traced back to as far as the 5th century BC. For example, one model uses past historical data that includes fracture zones calculated using gravity fields, and changes in the electromagnetic field and tidal cycles to determine the occurrence of earthquakes. It further uses ground based data. However, only one ground monitoring station is available. Thus, it precludes the possibility of real-time prediction. Therefore, what is also needed is a general methodology and device that identify signals associated with earthquakes in real-time.

BRIEF SUMMARY OF THE INVENTION

The present invention presents one aspect of identifying earthquake precursory signals by selecting a least one grid to generate a grid path, analyzing the grid(s) in a time-series using wavelet transformation, identifying at least one local wavelet maximum, generating a sequence of local wavelet maxima, identifying at least one singularity, measuring the geometrical space and time continuity of the singularity along the grid path, and identifying an anomaly.

In yet a further aspect of the invention, at least one maximum line may be propagated to reduce any potential numerical errors.

In yet a further aspect of the invention, a one-dimensional (1-D) real continuous wavelet transformation may be used to analyze a grid in a time-series.

In yet a further aspect of the invention, SLHF may be used.

In yet a further aspect of the invention, selecting a grid may be based on the tectonics of a region, such as a two-dimensional (2-D) space having dimensions width and height, a 2-D space having dimensions latitude and longitude, evolutionary algorithms, heuristics, continental boundaries, fault lines, and SLHF measurements.

In yet a further aspect of the invention, a grid path may be evaluated by at least one criterion and tolerance. Each criterion used may be based on at least one maximum length, at least one minimum spread, and at least one maximum anomaly.

In yet, a further aspect of the invention, geometrical measurements may involve the introduction of a discontinuity in space and/or time for compensating the rounding of errors in a wavelet transformation.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated in and form a part of the specification, illustrate an embodiment of the present invention and, together with the description, serve to explain the principles of the invention.

DETAILED DESCRIPTION OF THE INVENTION

The present invention is a method, program storage device readable by a machine, and device that uses data mining techniques, including wavelet transformations and spatial and/or temporal continuity analysis of wavelet maxima to identify earthquake precursory signals.

Specifically, the present invention may use wavelet transformations as data mining tools by computing wavelet maxima that propagate from finer to coarser scales. These maxima may be used in identifying strong anomalies in data. Amongst these maxima, those showing continuity in both space and time may be assumed to be potential precursors for earthquakes. Space continuity may be defined as: detected anomalies can be distributed in space according to a precise geometry conforming to a region's geological settings. Time continuity may be defined as: detected anomalies can occur at the same time or within a short delay of each other.

The present invention may be applied to SLHF data to study two earthquakes that occurred in Greece: one on Aug. 14, 2003 and another on Mar. 1, 2004. Significant SLHF anomalies may be found to be associated to each earthquake event. While these two earthquakes were chosen merely as examples since they occurred in the same region and within a short time span, it is important to note that the present invention is not limited to a particular region or time frame for detecting earthquakes.

Figure 1:
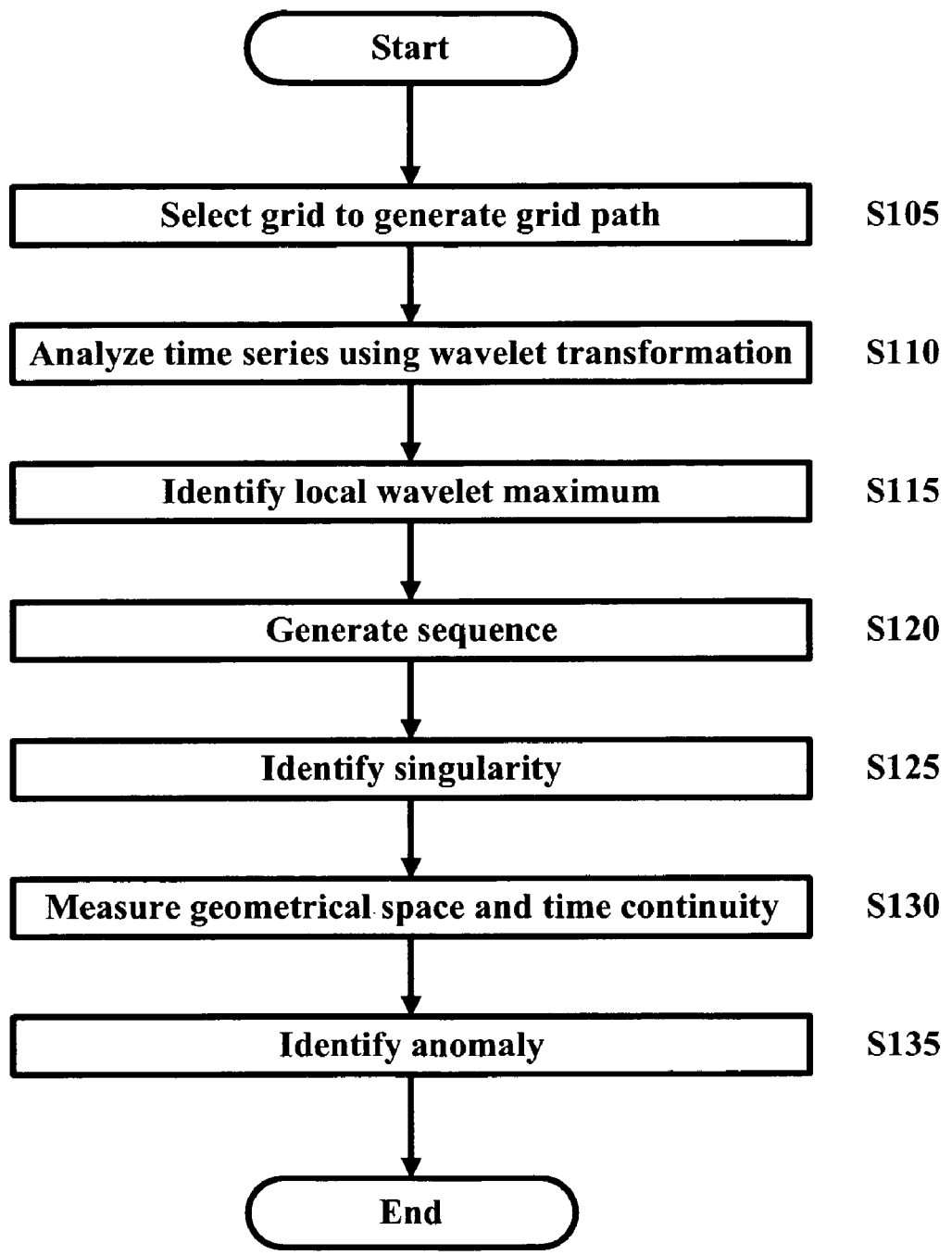
FIG. 1 shows a method for identifying earthquake precursory signals as per one aspect of the invention.

Referring to FIG. 1, earthquake precursory signals may be generally identified using a series of steps. These steps include: selecting at least one grid S105, where a collection of grids can be used to generate a grid path; analyzing a time-series on the grid(s) using wavelet transformation S110; identifying at least local wavelet maximum for each scale of the wavelet transformation S115; generating a sequence of local wavelet maxima S120; identifying at least one singularity using the sequence S125; measuring the geometrical space and time continuity of the singularity along the grid path S130; and identifying at least one anomaly S135.

This method can be stored in a program storage device readable by a machine 205. Such device 205 can embody instructions executable by the machine to perform the method. Examples of program storage devices include, but are not limited to, computers, compact discs (CDs), digital video discs (DVDs), floppy disks, zip disks, hard drives, flash memory sticks/cards, random access memory (RAM), read only memory (ROM), etc.

Figure 2A:
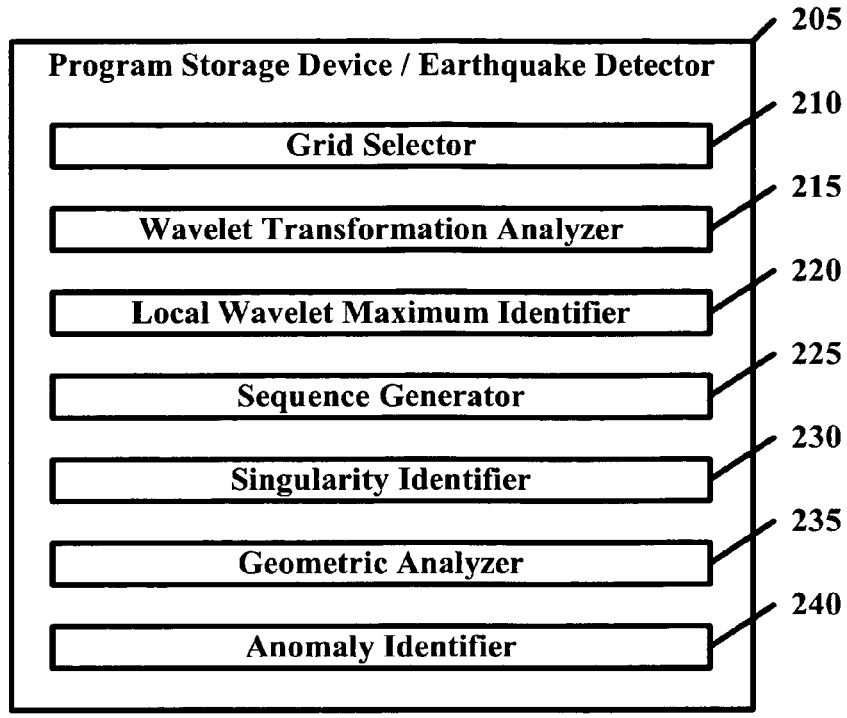
FIG. 2a shows an embodiment of an earthquake detector as per one aspect of the invention.
Figure 2B:
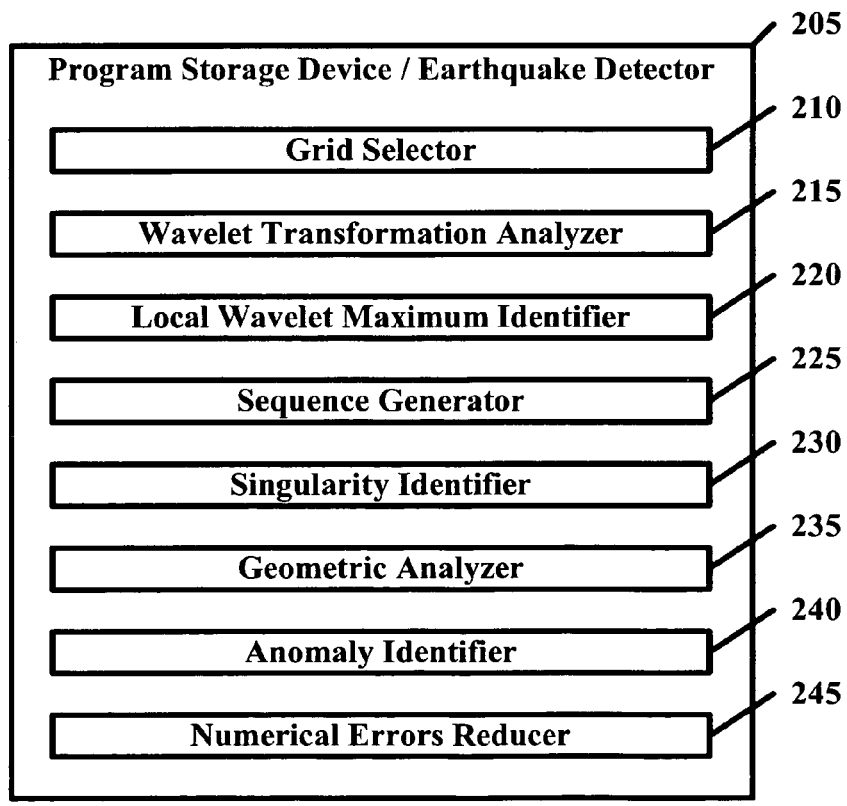
FIG. 2b shows another embodiment of an earthquake detector as per one aspect of the invention.

To achieve this method, and other limitations below, an earthquake detector 205 may be used. As illustrated in FIG. 2a, the earthquake detector 205 may have a grid selector 210, a wavelet transformation analyzer 215, a local wavelet maximum identifier 220, a sequence generator 225, a singularity identifier 230, a geometric analyzer 235, and an anomaly identifier 240. It may also have a numerical errors reducer 245, as shown in FIG. 2b, to propagate at least one maximum line to reduce or ignore numerical errors. Examples of such device include, but are not limited to, personal digital assistants (PDAs), or its equivalent, mobile detector, centralized and/or localized detector, etc.

The grid selector 210 is capable of selecting at least one grid to generate a grid path S105. The wavelet transformation analyzer 215 is capable of analyzing wavelet transform in a time-series S110. The local wavelet maximum identifier 220 is capable of identifying at least one local wavelet maximum for each scale of the wavelet transformation S115. The sequence generator 225 is capable of generating a sequence of at least one local wavelet maximum S120. The singularity identifier 230 is capable of identifying at least one singularity using said sequence S125. The geometrical analyzer 235 is capable of measuring space and time continuity of at least one singularity along the grid path S130. The anomaly identifier 240 is capable of identifying at least one anomaly S135.

Collectively, the method, program storage device and earthquake detector can share the following additional embodiments. First, any potential numerical errors, such as noise, may be reduced or ignored by propagating at least one maximum line, or by considering only the longest maxima lines. To help accomplish this feature, a numerical errors reducer 245 may be used. Second, the grid(s) may be analyzed in a time-series using a 1-D real continuous wavelet transformation. Third, SLHF may be used. Fourth, to select a grid, it is preferable to use the tectonics of a region. Examples of tectonics include, but are not limited to, a 2-D space having dimensions width and height (or alternatively longitude and latitude), at least one evolutionary algorithm, heuristics, at least one continental boundary, at least one fault line, and SLHF measurements. Fifth, the grid path may be evaluated using at least one criterion and at least one tolerance. The criterion may be based on at least one maximum length, minimum spread and maximum anomaly. Sixth, the geometrical measurement may even include a step of introducing a discontinuity in space and/or time for compensating rounding errors in a wavelet transformation.

The present invention may be applied to different types of spatial and/or temporal data. It is not meant to be bound to a particular spatial resolution or region in the world, or time sampling. Generally, earthquakes around the world are not randomly distributed. Rather, they tend to be concentrated in narrow, specific regions, such as along plate boundaries.

According to the United States Geological Survey (USGS), an earthquake occurs when there is a sudden slip on a fault that results in ground shaking and radiated seismic energy caused by the slip, or by volcanic of magmatic activity, or other sudden stress changes in the earth. A fault is a fracture along the Earth's crust in which the blocks of crust on either side have moved relative to one another parallel to the fracture. Fault fractures can be vertical or nearly vertical, or inclined. Where vertical or nearly vertical ones occur, blocks of crust tend to shift horizontally. Where inclined fractures occur, blocks of crust tend to shift vertically.

For purposes of exemplifying the usefulness and advantages of the present invention, the seismicity of Greece was considered.

Greece is located in the most seismically active region of the Mediterranean and West Eurasian plate. This region is a part of the collision zone between the Eurasian and African plates, where earthquakes and volcanic eruptions are common. Two main different plate tectonic boundaries southwest and east of Greece are the Hellenic Trench and the Hellenic Arc. The Hellenic Trench is the largest area of subduction, in which the denser African plate goes under the less dense Eurasian plate. In this region, magma rises from under the Earth's crust resulting in a large number of volcanoes. The Hellenic Arc is a transformation boundary, in which the African and Eurasian plates slide side by side, causing many fault lines which are responsible for numerous earthquakes. However, there are no volcanoes in this region.

Figure 3:
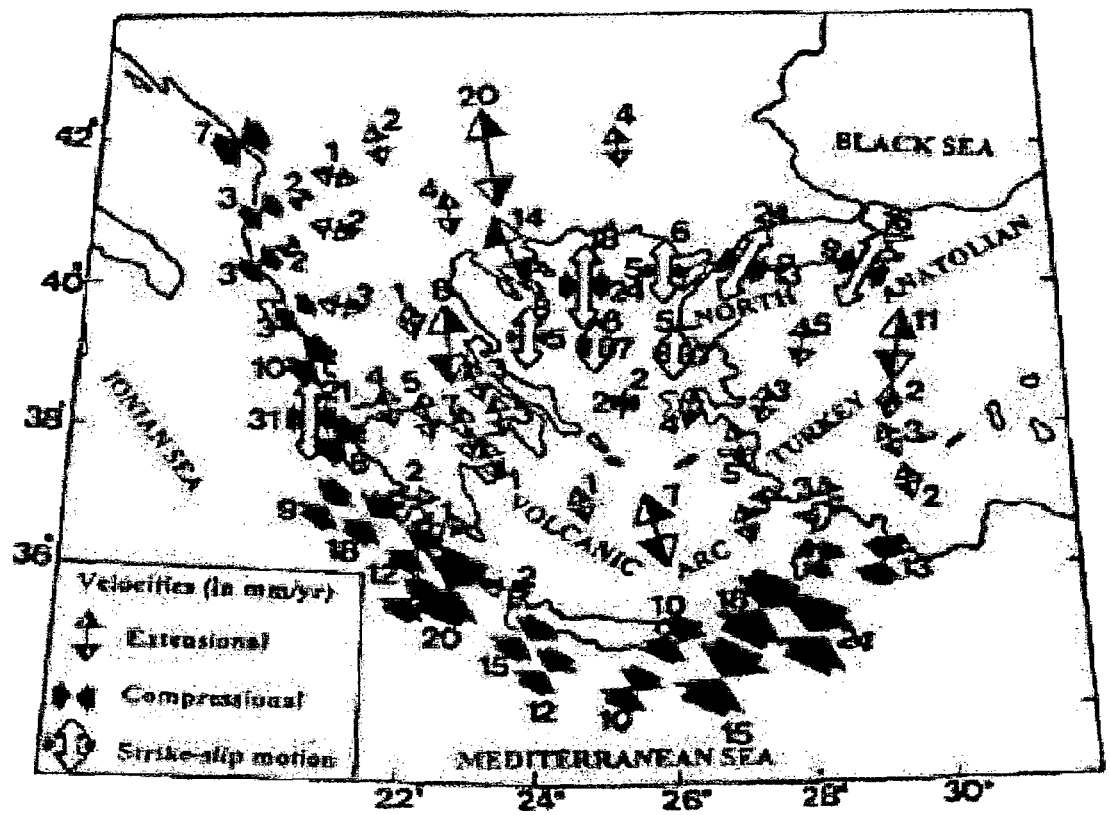
FIG. 3 shows extensional, compressional and strike-slip motions of Greece's tectonics.

Typically, earthquakes are common in areas with high tectonic activities. Greece has different types of tectonic regions, namely extensional, compressional and strike-slip motions, as illustrated in FIG. 3. In these areas, earthquakes tend to exhibit large magnitude in the compression and strike-slip zone, but small magnitude in the extension zone. Extensional motion, which can be coined as tensional stress, is the pulling-apart type of motion. According to the USGS, tensional stress is the stress component perpendicular to a given surface, such as a fault plane, that results from forces applied perpendicularly to the surface of from remote forces transmitted through a surrounding rock. Compressional motion, which can coined as compressional stress, is the squeezing type of motion. As the USGS describes, compressional stress is the stress component perpendicular to a given surface, such as a fault plane, that results from forces applied perpendicularly to the surface or from remote forces transmitted through a surrounding rock. Strike-slip motion, which can be coined as sheer stress, is the stress component parallel to a given surface, such as a fault plane, according to the USGS, that results from forces applied parallel to the surface or from remote forces transmitted through a surrounding rock. According to the USGS, strike-slip fractures are typically vertical blocks that have mostly moved horizontally.

According to the USGS, plate tectonics is a theory that combines concepts of continental drifting and sea-floor spreading. This theory suggests that the Earth's rigid outer shell, known as the lithosphere, is broken into a plurality of oceanic and continental plates. These plates are in constant motion and have the ability to slide over the uppermost layer of the mantle, known as the asthenosphere. Currently, there exist seven major plates, which are subdivided into smaller plates. Each is approximately 80 kilometers thick; each is in constant motion relative to one another. The rate of motion ranges between 10 to 130 millimeters per year. The patterns of movement are neither symmetrical nor simple.

Greece is known as a highly seismic and rapidly deforming region. On Aug. 14, 2003, an earthquake with a magnitude of 6.4 on the Richter scale occurred approximately 40 km off the Ionian island of Lefkada in Western Greece. Fifty people were injured, and the region suffered heavy damages. The epicenter was approximately located at 39.18° N, 20.74° E in the Ionian Sea with a focal depth of 10 km. Following this main earthquake were two strong aftershocks, including a series of smaller aftershocks.

On Mar. 1, 2004, an earthquake of magnitude of 5.7 occurred about 7 km northwest of the city of Kalamata. The area suffered light to moderate structural damages. Fortunately, no casualties were directly associated with this seismic event. The epicenter was approximately located at 37.23° N, 22.24° E in the SW Peloponnesos, with a focal depth of 7 km. The epicenter for this earthquake is located approximately 13 km north of the epicenter of the Aug. 14, 2003 earthquake.

Figure 4:
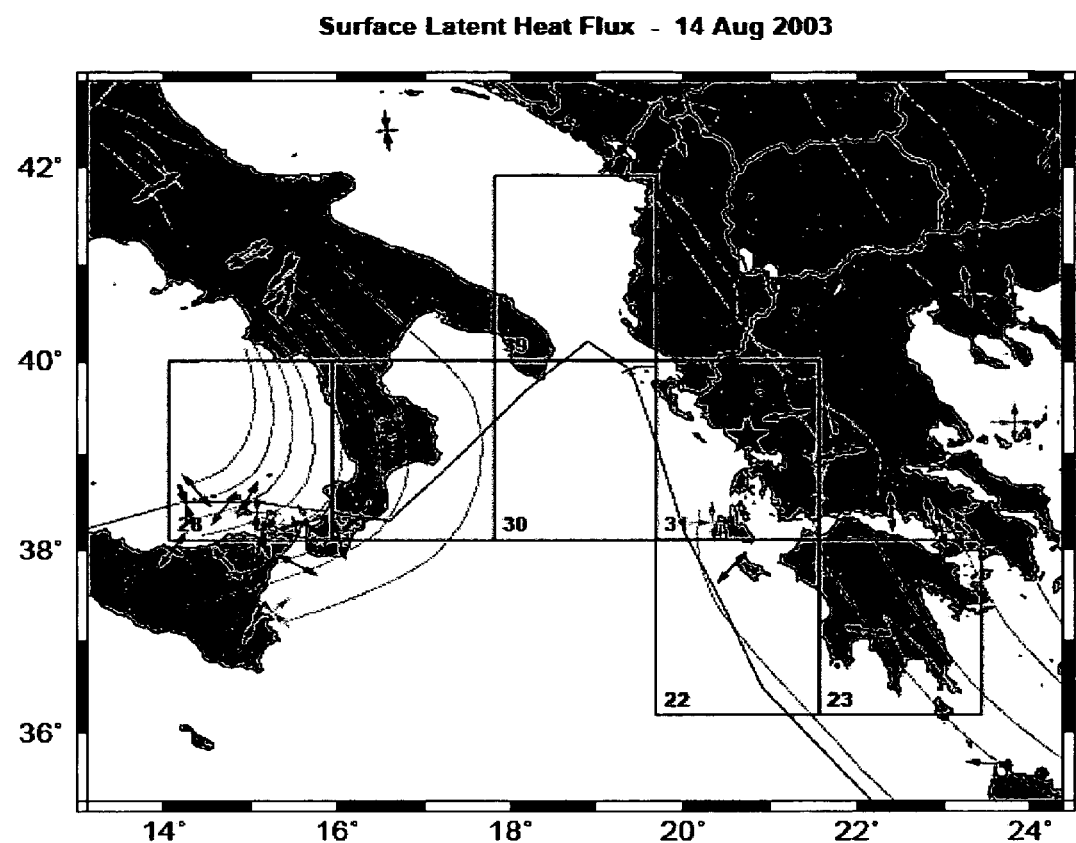
FIG. 4 shows a map of Greece regarding an Aug. 14, 2003 earthquake that occurred in Greece.
Figure 15:
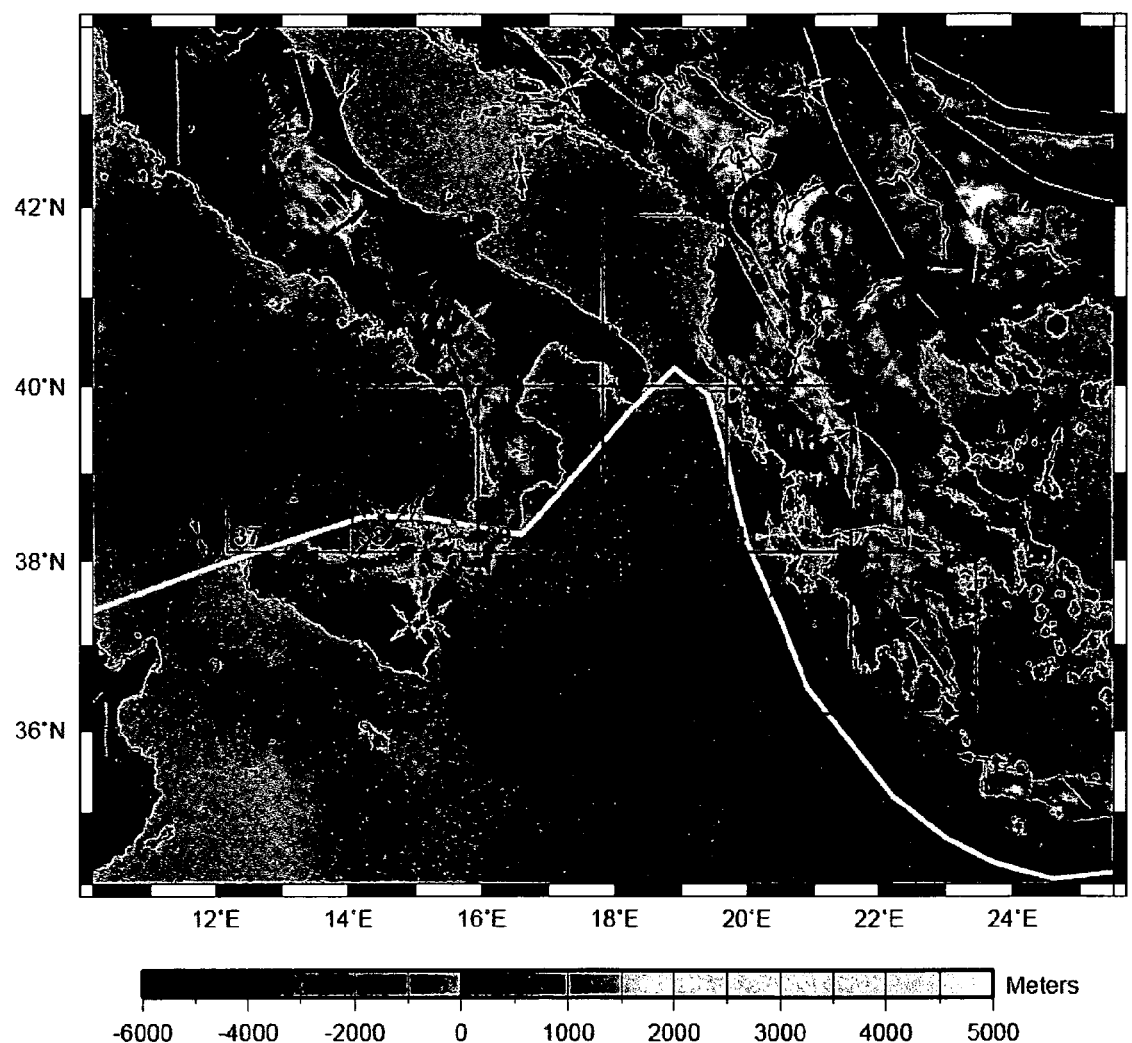
FIG. 15 shows yet another map of Greece, where the epicenter of the Aug. 14, 2003 earthquake and the epicenter of the Mar. 1, 2004 earthquake are denoted with stars.

Generally, in about every two years, an earthquake having a magnitude of 5 or higher on the Richter scale occurs within 60 km of both these epicenters. Both FIGS. 4 and 15 show a map of northern Greece. Stars denote the location of an epicenter. Also shown are the location of the plate boundary, fault lines and their type (i.e., extensional, compressional and transformation).

As explained by the USGS, the Richter scale is a magnitude scale developed in 1935 by Charles F. Richter of the California Institute of Technology. This scale serves as a mathematical device to measure and compare earthquake sizes. A magnitude may be determined from the logarithm of the amplitude of waves recorded by seismographs. Adjustments can be included to account for variations in distances between various seismographs and the epicenter of earthquakes.

Magnitude may be expressed in whole numbers and decimal fractions. For example, an earthquake having a magnitude of 5.3 may be deemed as a moderate earthquake, whereas one having a magnitude of 6.3 may be deemed as a strong earthquake. Since the scale is based on logarithmic scale, each whole number increase represents a ten-fold increase in measured amplitude. Equivalently, as an estimate of energy, each whole number increase corresponds to a release of approximately 31 times more energy than the amount associated with the preceding whole number. Instruments using the Richter scale can be carefully calibrated with respect to each other so that the magnitude may be computed from the record of any calibrated seismograph.

Data used may include SLHF data from Jan. 1, 1998 to Oct. 31, 2003 for the region bounded by latitudes 32° N to 44° N and longitudes 15° E to 30° E. In addition, data may also include SLHF data from Jan. 1, 1998 to Mar. 28, 2004 for the region bounded by latitudes 33° N to 45° N and longitudes 14° E to 28° E. SLHF data may be obtained from the Scientific Computing Division of the National Center for Atmospheric Research (NCAR).

The data set may be represented by a Gaussian grid having 94 lines from the equator to a pole with a regular 1.8° longitudinal spacing and projected into rectangular grid having dimensions of 2° latitude by 2° longitude. The global database of various meteorological parameters is often maintained by National Centers for Environmental Protection (NCEP). This database may be generated by taking into consideration measured values at various worldwide stations and data retrieved from satellites. The fluxes used in operational weather forecast models may incorporate in-situ observations through an assimilation process. However, the data source may be a frequent change of assimilation methodology and model resolution, which has be solved by NCEP's well-known re-analysis procedure that incorporates a whole archived data set into a single, frozen data assimilation system.

Other data used may include those that identify and plot the location of plate boundaries. It is well-known in the art that this data consists of the best fitting Euler vectors, closure fitting Euler vectors and the global model NUVEL-1. Such model may be used to geologically describe current plate motions between 12 assumed rigid plates. Additionally, data identifying and plotting slab contours may also be used. Such data may include contours of the upper edge of subducting slabs calculated using relocated hypocentres. Furthermore, data used to identify and plot major fault lines may also be used. Moreover, data used to identify and plot the types of fault lines may be used. This data has been developed in the PLATES project by the Institute of Geophysics at the University of Texas.

The present invention's multi-strategy approach may employ a 1-D real continuous wavelet transformation to discover singularities in a time-series for a particular grid, and a geometrical analysis of the continuity in time and space of detected singularities across several grids adjacent to the epicenter chosen according to the tectonics of the region, such as continental boundaries of fault lines, etc. The approach may be tested using SLHF data. However, it is not constrained to a specific type of data. For example, the approach may use Precipitable Water data. The approach employing SLHF data may be implemented using a software called CQuake using, but not limited to, C, Java, Perl, Java R code, statistical package R, mathematical package octave developed at the University of Wisconsin in combination with the WaveLab library developed at Stanford University, and General Mapping Tool (GMT) collection of functions developed at the University of Hawaii.

Wavelet Transformation

For any given real value function $\phi$ with zero average $$\int_{-\infty}^{\infty} \phi(t) dt = 0, \text{ let}$$

$$Wf(u,s) = \int \frac{f(t)}{\sqrt{(s)}} \phi\left(\frac{t-u}{s}\right) dt \quad (1)$$

be the real continuous wavelet transformation of a function $f$. Since $\phi$ has zero mean, the previous integral measures the variation of $f$ in a neighborhood of time (position) u of size proportional to the so-called scale factor s>0.

The set $(u_0, s_0)$ may be defined to be a modulus maximum if $|Wf(u,s_0)|$ is a local maximum, i.e., if $$\frac{\partial Wf(u_0, s_0)}{\partial u} = 0 \quad (2)$$

and if $Wf(u,s_0)$ is strictly increasing at the left of $u_0$ or strictly decreasing at the right of $u_0$. In other words, the isolated local maxima (along the position coordinate u) of the wavelet transformation $Wf(u,s)$ for each scale s>0 may be identified.

A connected curve $\gamma$ in the scale-time place may be called a maxima line if $(u,s) \in \gamma$ implies $(u,s)$ is a modulus maximum.

Since the modulus maxima are isolated at each scale $s_0$, for each $(u_0, s_0)$, there may be at most one curve $\gamma$ that locally intersects the point $(u_0, s_0)$. However, there may be none.

A singularity $t_0$ of the function $f$ may be defined as a point for which the derivative $$\frac{df}{dt}$$

is not defined. Modulus maxima may carry a significant degree of information about the position of singularities. More particularly, it may be possible to prove that for every singularity, $t_0$ of $f$, it may be possible to find a sequence of modulus maxima $(u_i, s_i)$ such that $s_i \to 0$ and $u_i \to t_0$.

It is preferred that the word "sequence" be used in lieu of the words "maxima line." In general, maxima lines may break up and stop before reaching the smallest scales. This break may present a problem in using maxima lines to identify singularities. However, there is a choice of $\phi$ that may be immune to this problem. If $\phi$ is a derivative of a Gaussian, then all modulus maxima may belong to maxima lines that propagate to fine scales. It is preferable to proceed with this choice.

It should be noted that even though sharp, isolated singularities of $f$ may be expected to be found at the abscissa of end points of significant maxima lines, such finding may not always be the case. There can be maxima lines that converge to perfectly smooth points of $f$.

A rigorous detection of the singularities may also require the computation of the Lipschitz regularity coefficient of $f$ at the abscissa of the end point of the maxima lines.

However, it is preferable to use only the detection of significant maxima line as a possible indication of the presence of sharp singularities.

Figure 16:
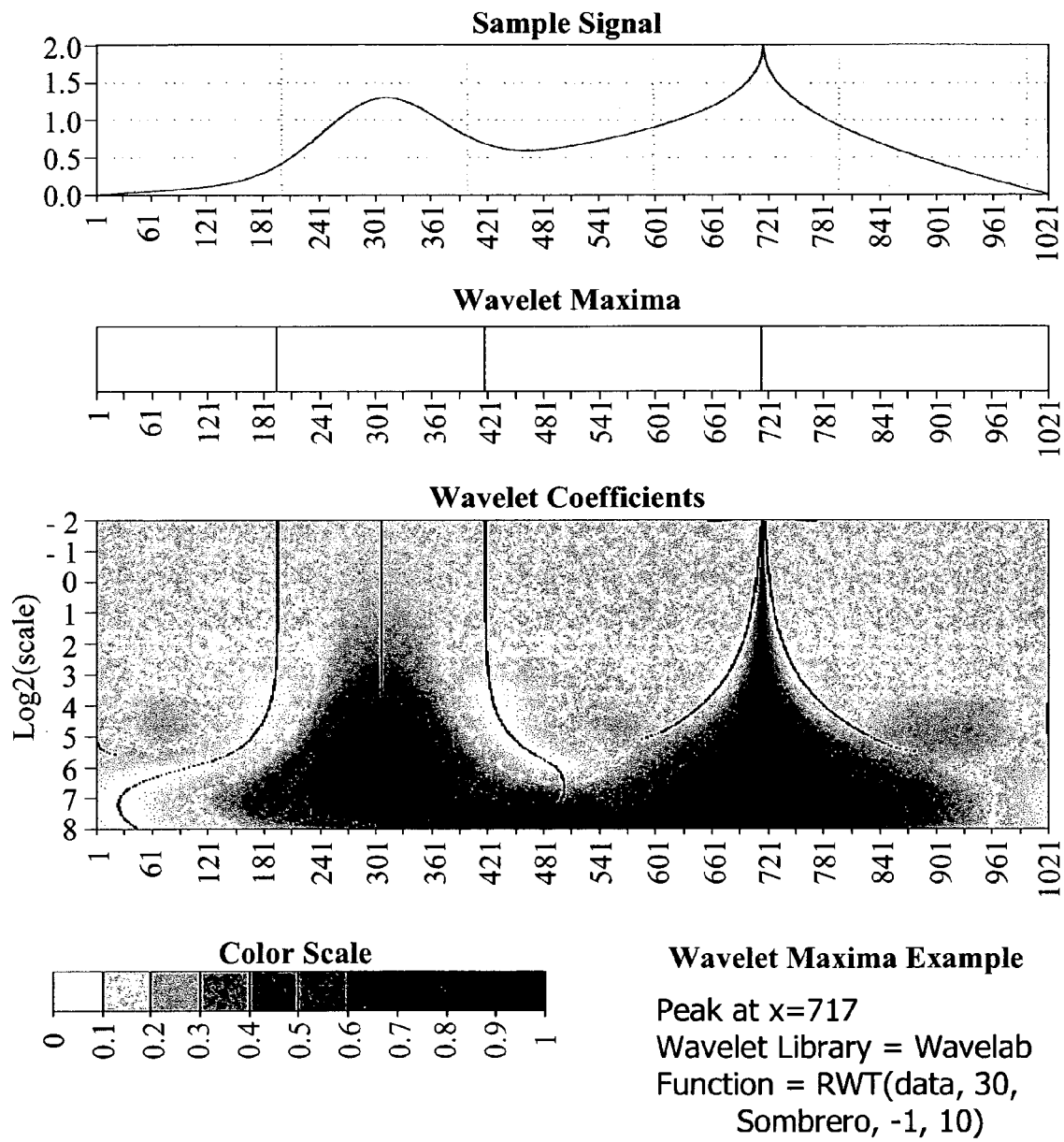
FIG. 16 shows an example of wavelet analysis and corresponding maxima curves.

As depicted in FIG. 16, a function with a non-smooth point at t=717 and the corresponding set of maxima lines may be shown. The example shows that some points converge for $s \to 0$ to 717, but there are some maxima curves converging to smooth points of the curve.

When dealing with signals with significantly large numerical errors, the number of maxima lines may also be very large. One way of lessening the impact of high frequency numerical errors, such as noise, is to select only the longest or most important maxima lines. As a way to accomplish this goal, a parameter called "propagation factor" (identified with $\xi$) may be introduced, where its values may be $0 \leq \xi \leq 1$. This parameter may be used to determine the fraction of the total number of scales S that a maxima line $\gamma$ must intersect to be considered as significant, i.e., $$\gamma = \begin{cases} \text{significant} & \text{if length}(\gamma) \geq \xi S \\ \text{notsignificant} & \text{if length}(\gamma) < \xi S \end{cases} \quad (3)$$

The length of γ may be computed from finer scales (high frequencies) to coarser scales (low frequencies). It is preferable to consider as significant the maxima lines that propagate at least up to scale≈ξS. It should be noted that S and ξS may be dependent on the specific discretization of the real continuous wavelet transformation. While there may be an unavoidable degree of ambiguity in the choice of discretization parameters, it is not likely to significantly affect the quality or robustness of the results.

While maxima lines were discussed in the context of continuous scale variation and continuous position variation, in practice, the identification of maxima lines may be performed in a discrete setting. Hence, there could be errors that prevent the very last point of the maxima line to converge to the probable singularity. Therefore, to have a more robust estimate of the time at which singularity occurs, the following formula may be needed:

$$g(\gamma, n) = \frac{\sum_{i=1}^{n} \gamma_i}{n} \quad (4)$$

This formula tends to correspond to the average of the values at the abscissa of the last n end points of the maxima line, where n is a parameter either fixed or proportional to the number of scales, and $\gamma_i$ is the abscissa value of γ at scale i. In cases having daily data, the calculated value g(γ, n) may correspond to the approximate day when the anomaly occurred. Experiments indicate that the average of the last 10 values (n=10) can yield accurate determination of days corresponding to detected singularities. Yet still, it is important to note that smaller or larger values of n may be affected by the overall trend or by numerical errors introduced by a signal's high frequency components.

The final result of the wavelet analysis is typically a characteristic vector of the same length as the original signal, where all values may be set to zero except for those corresponding to the calculated values of g(γ, n) for all significant maxima lines γ. Such points may be set equal to the length of γ, or to the propagation of the maxima line. The resulting characteristic vector may indicate both the time when a singularity was detected, and the singularity's weight as defined by the propagation of the corresponding maxima line.

It should be noted that 1-D wavelet transformations are preferable in wavelet analysis over 2-D wavelet transformations because the latter may not be able to detect the geometry of a signal or fault line. Moreover, similar 1-D construction along a continental boundary or fault line may still be needed. Hence, the algorithm associated with 1-D measurements may be limited to avoid unnecessary complications.

Furthermore, 1-D wavelet transformations may effectively filter out peaks due to small high frequency variations, which tend to be associated with very short lines γ. Peaks caused by seasonal trends may also disregarded because the length of γ can be computed either from finer to coarser scales or higher to lower frequencies. Therefore, depending on propagation factor ξ, it may not be necessary if a line γ propagates all the way to the coarser scales or lowest frequencies, which can be affected by seasonal trends.

Continuity of Detected Singularities in Space and Time

The previously described wavelet analysis may be applied to a time-series of several grids corresponding to an epicentral region. The result of the analysis may identify several anomalous peaks, which may be caused by earthquakes or by atmospheric or oceanic perturbations. For example, SLHF is an atmospheric parameter that is directly correlated to the evaporation of water on the surface. SLHF may be affected by changes in land surface temperature and SST. The origin of an increase of decrease of surface temperature can be caused by atmospheric perturbations, such as strong winds, precipitation, intense cloud cover, or geological phenomena.

Such disturbances may be filtered starting with an assumption that seismic activity is a large scale phenomena that manifests with a precise geometry conforming to geological properties of a region. Peaks caused by earthquakes may be discriminated from peaks caused by atmospheric perturbations by using the concept of geometrical continuity under space and time constraints. Not only may anomalous peaks associated with earthquake events appear over a large area, but they may also follow a precise geometry as determined by a region's geological conditions. This characteristic generally means that a significant anomaly in one grid may be related to significant anomalies in other grids if they all follow a precise geometrical path conforming to geological settings. Examples of such settings include continental boundaries, fault lines, orography, sea depth and other characteristics that may help play a role on how anomalies might spread around an epicentral region. A collection of grids that satisfy these geometrical constraints may be called "a grid path."

It can be helpful to include a geometrical continuity of grid paths as a spatial constraint. This continuity can be used to single out any signal related to earthquakes. Furthermore, anomalies over a grid path may need to appear within a short period of time, such as a day or two. This presence may provide an additional constraint of the continuity of time.

Generally, spatial and temporal constraints can be used to "link," in a suitable way, a singularity detected in each single grid to discriminate signals most likely due to an impending earthquake from signals that are likely due to other phenomena. As one aspect of creating this "link," grid paths may need to be selected. Justification of the selection may be necessary because a selection of contiguous grids defining the grid path can greatly affect the results of the methodology employed.

However, the behavior of parameters involved may not respect fully any continuity along a suitably chosen grid path. This effect may be partly due to atmospheric disturbances (such as wind, precipitation, etc.) or discontinuities in the sub-surface. Therefore, taking into account such factors, alternative grid paths should be selected.

Selecting grid paths may be viewed as a search in a 2-D space, where the dimensions are width and height. Alternatively, the dimensions can be based upon longitude and latitude. Selection may be done using a specialized search technique, such as evolutionary algorithms, or heuristics that can take into account different factors, which may affect the signal shape. Grids may even be selected by simply taking into account continental boundaries or fault lines. Moreover, the time-series measurements tend to be sufficiently smooth in space and time. Such smoothness can potentially make the grid selection robust under small perturbations of the grid path. The robustness factor may become more prevalent if higher resolution data is used.

Once the grid path is identified, the previously described wavelet-based algorithm may be applied and/or repeated for the time-series of selected grids to determine which signal is most likely associated with an earthquake.

The wavelet analysis may be performed using one of two ways: (1) a stepwise format or (2) a smoothing format.

In the first way, results of a wavelet analysis for different grids may be combined in a two dimensional matrix N(n×m), in which the row(s) n, correspond to time, and the column(s) m correspond to grid(s) of the grid path at which the wavelet analysis may be performed. The values may either be the propagation length of significant maxima lines or zero if no lines were detected in this particular point in space and/or time. A continuity line χ may be a signal that propagates in space and time across all non-zero cells of N for at least minLength columns and within maxDisc rows, where minLength and maxDisc are user defined parameters.

As one embodiment of generating continuity lines, a recursive algorithm, which take into account the following constraints, may be used:

1. C1: The minimum length of χ ought to be equal to or larger than the parameter minLength.
2. C2: The time discontinuity can be at most ±maxDisc.
3. C3: The space discontinuity can be at most one consecutive grid, but cannot be at either the first or last grid.

These constraints and derived formulas may be formalized using the following:

$$\min(|\chi_i|) \geq minLength \quad (5)$$

where $$|\chi_i| = \sum_{j=1}^{m} A_{i,j} - d_i \quad (6)$$

is the length of a continuity line χ at time i, where $$A_{i,j} = \begin{cases} 1 & p_{i,j} > 0 \\ 0 & p_{i,j} = 0 \end{cases} \quad (7)$$

and $$p_{i,j} = \begin{cases} N(i,j) & \text{if } p_{i+k,j+1} > 0 \\ & j - maxDisc < k < j + maxDisc \\ 0 & \text{otherwise} \end{cases} \quad (8)$$

and $$d_i = \sum_{j=2}^{m-1} B_{i,j} \quad (9)$$

where $$B_{i,j} = \begin{cases} 1 & p_{i,j} > 0 \\ & p_{i+k,j+1} = 0 \\ & p_{i+k,j+2} > 0 \\ 0 & \text{otherwise} \end{cases} \quad (10)$$

The discontinuity in space and time may be introduced to compensate for rounding errors in the wavelet transformation. They may also help compensate for the approximation due to the averaging of the end points of significant maxima lines. Furthermore, they may help factor in geophysical anomalies, such as wind, atmospheric perturbations and land orography.

Each grid path generated may be evaluated according to a multi-criterion evaluation function to determine the most important signals. Such function may evaluate all signals using pairs of the form c, τ, where c is a criterion, and τ is a tolerance expressed in percentage. For each criterion c, it may compute the maximum value and select only the paths within tolerance of the maximum value. Typically, the paths which satisfy all criteria are considered to be significant. Three different criteria c may be used: 1) maximum length, 2) minimum spread and 3) maximum anomalies.

1. Maximum Length

This criterion evaluates the length of a path χ by summing the number of grids where a propagating signal may be present. As described earlier, a discontinuity in a single grid may be allowed to compensate errors, which may be due to anomalies in fault line, geology or calculations. Taking into account such discontinuities, a parameter called "penalization coefficient" (PC) may be introduced to indicate a value that is subtracted for each discontinuity. For example, if the penalization coefficient is equal to 0.5, a path of length 5 with no discontinuity is equivalent to a path of length 6 with two discontinuities.

Alternatively, it is possible to add an increasingly larger penalization coefficient to each new anomaly such that paths with numerous discontinuities can be penalized more heavily.

2. Minimum Spread

This criterion evaluates the spread in time of a signal by considering the standard deviation for all paths and keeping only those paths with smaller values. It may penalize signals that propagate across a fault line with a large discontinuity in time. For example, assume minDisc=2 (days). Here, a signal would be moving two days forward in time across a fault line. Hence, it should appear in grid 1 at time 100, grid 2 at time 102, grid 3 at time 104, etc.

3. Maximum Anomalies

This criterion takes into consideration any statistical significance of anomalies associated with an earthquake event. Each wavelet maxima may correspond to a peak of an original signal. Its statistical significance may be proportional to the size of the anomaly. Typically, large anomalies are usually one to two sigmas above the mean value.

Figure 12:
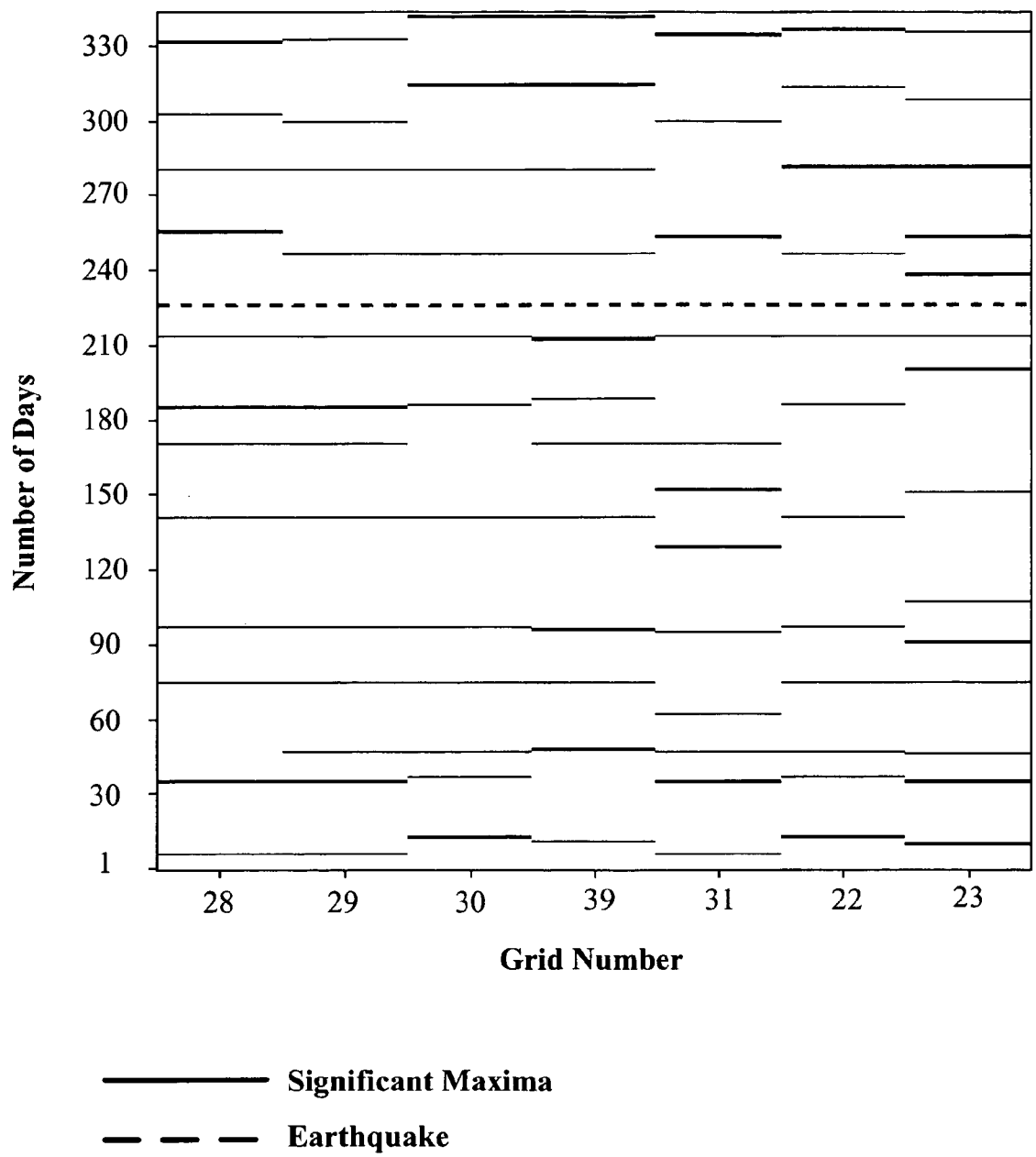
FIG. 12 shows wavelet maxima computed in wavelet transformations for different grids, where the epicenter of the Aug. 14, 2003 earthquake occurred in Grid 31.

FIG. 12 shows the time of occurrence of wavelet maxima for different grids. It indicates points in space and time where significant singularities in SLHF may be detected.

Figure 13:
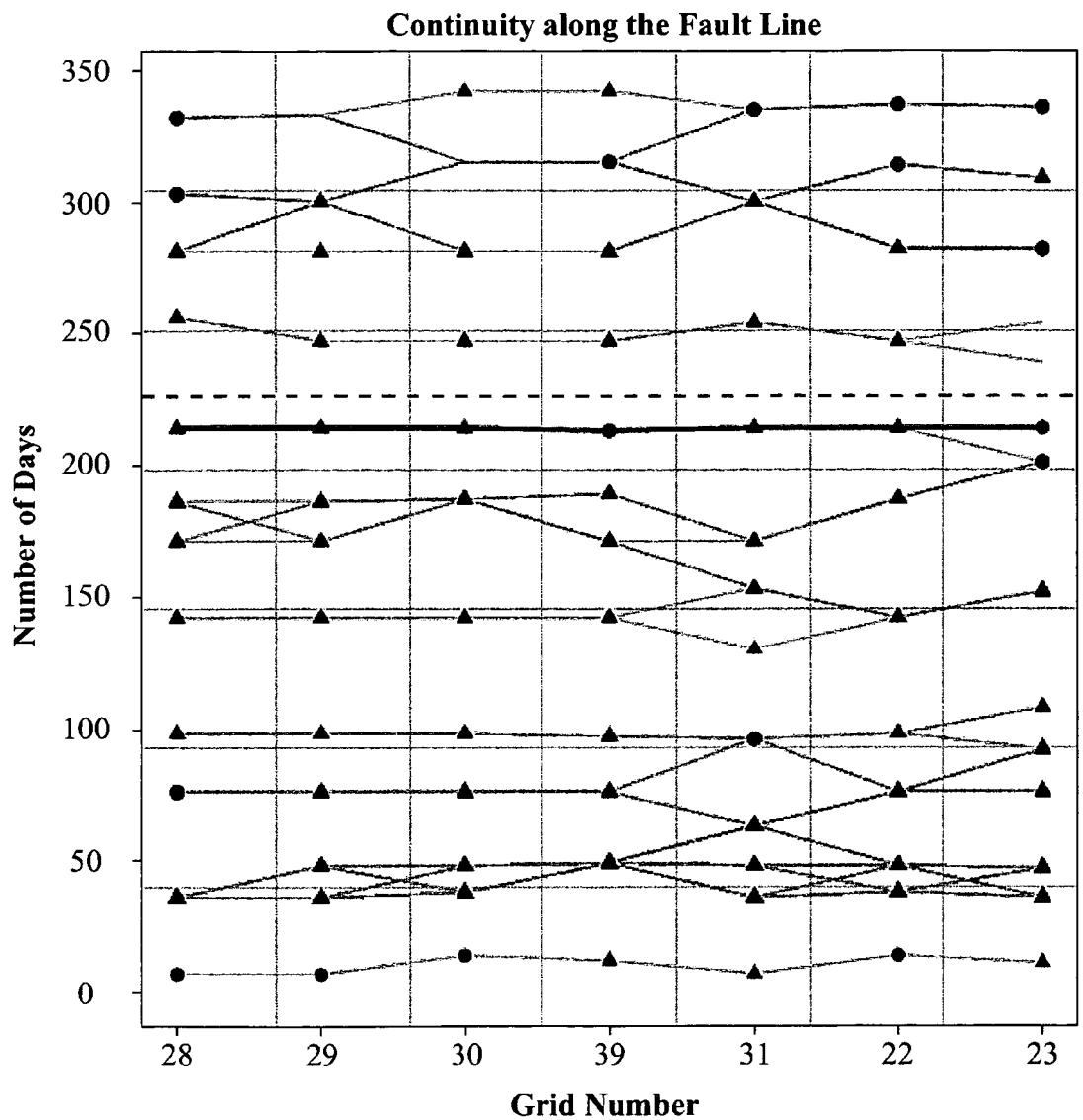
FIG. 13 shows results of possible paths of wavelet maxima computed in wavelet transformations.

FIG. 13 shows the continuity of wavelet maxima in time and space. Significant signals are represented by horizontal lines. The day of the earthquake is shown with a dashed line. Peaks above one and two sigmas are respectively indicated with circles and triangles. The most significant signal is shown with the thicker line.

Similarly, using the second way, results of a wavelet analysis for different grids may be combined in a two dimensional matrix N(n×m), in which the row(s) n, correspond to grid(s) of the grid path at which the wavelet analysis may be performed, and the column(s) m correspond to time. The values may either be the propagation length of significant maxima lines or zero if no lines were detected in this particular point in space and/or time. A continuity line χ may be a signal that propagates in space and time across all non-zero cells of N for at least minLength rows and within maxDisc columns, where minLength and maxDisc are user defined parameters.

As one embodiment of generating continuity lines, a recursive algorithm, which take into account the following constraints, may be used:

1. C1: The minimum length of χ ought to be equal to or larger than the parameter minLength.
2. C2: The time discontinuity can be at most ±maxDisc.
3. C3: The space discontinuity can be at most one consecutive grid, but cannot be at either the first or last grid.

These constraints and derived formulas may be formalized using the following:

$$\min(|\chi_c|) \geq \text{minLength} \tag{11}$$

specifying that the length of the continuity line $\chi$ at time c ought to be greater than or equal to minLength, where $$|\chi_c| = \sum_{r=1}^{n}\left(A_{r,c} - \sum_{r=1}^{n-2}(D_{r,c} * PC)\right). \tag{12}$$

This length may correspond to the number of detected anomalies A minus the number of discontinuities for a chosen grid path D. Discontinuities may be penalized by the parameter PC, which tends to indicate a value that is subtracted for each discontinuity. For example, if PC is equal to 0.5, a path of length 5 with no discontinuity is equivalent to a path of 6 with two discontinuities. Alternatively, it is possible to add as an increasingly larger penalization to coefficient to each new anomaly such that paths with many discontinuities can be penalized more heavily.

$$A_{r,c} = \begin{cases} 1 & N(r,k) > 0 \\ & c - \text{maxDisc} < k < c + \text{maxDisc} \\ 0 & \text{otherwise} \end{cases} \tag{13}$$

An anomaly A for grid r and time c may be detected if a wavelet maximum exists for grid r and time k. Time k may be defined as the interval of the original time c±maxDisc, and it can represent the maximum time discontinuity allowed.

$$D_{r,c} = \begin{cases} 1 & \begin{aligned} N_{r,k} &> 0 \\ N_{r+1,k} &= 0 \\ N_{r+2,k} &> 0 \end{aligned} \\ & c - \text{maxDisc} < k < c + \text{maxDisc} \\ 0 & \text{otherwise} \end{cases} \tag{14}$$

A discontinuity for grid r and time c may be detected if a wavelet maximum exists for grid r and grid r+2, but does not necessarily exist for grid r+1. The time k may be defined as given in Equation (14). There may be at most a discontinuity of a single grid.

Just as the stepwise format, the discontinuity in space and time may also be introduced to compensate for rounding errors in the wavelet transformation. They may also help compensate for the approximation due to the averaging of the end points of significant maxima lines. Furthermore, they may help factor in geophysical anomalies, such as wind, atmospheric perturbations and land orography.

Each grid path generated may be evaluated according to a multi-criterion evaluation function to determine the most important signals. Such function may evaluate all signals using pairs of the form $K\tau$, where K is a criterion, and $\tau$ is a tolerance expressed in percentage. For each criterion K, it may compute the maximum value and select only the paths within tolerance of the maximum value. Typically, the paths which satisfy all criteria are considered to be significant. Like the stepwise format, three different criteria K may be used: 1) maximum length, 2) minimum spread and 3) maximum anomalies.

1. Maximum Length

This criterion evaluates the length of a path $\chi$ by summing the number of grids where a propagating signal may be present. As described earlier, a discontinuity in a single grid may be allowed to compensate errors, which may be due to anomalies along the selected grid path due to rounding errors or inhomogeneity in the sub-surface.

2. Minimum Spread

This criterion evaluates the spread in time of a signal by considering the standard deviation (sigma) for all paths and keeping only those paths with smaller values. It may penalize signals that propagate across a fault line with a large discontinuity in time. For example, assume minDisc=2 (days). Here, a signal would be moving two days forward in time across a fault line. Hence, it should appear in grid 1 at time 100, grid 2 at time 102, grid 3 at time 104, etc.

3. Maximum Anomalies

This criterion takes into consideration any statistical significance of anomalies associated with earthquake events. Each wavelet maxima may correspond to a peak of an original signal. Its statistical significance may be proportional to the size of the anomaly.

Typically, large anomalies are usually one to two sigmas above the mean value.

Finally, whether a stepping format or smoothing format is used, to compare different earthquakes, the concept of anomaly A may be introduced. Anomaly A may be defined as:

$$A = \frac{X_i - M}{STD} \tag{15}$$

where $X_i$ is the SLHF at time i, M is the 30-day average for previous years, and STD is the standard deviation of M.

Experiments

1. Stepping Format

Referring to FIG. 4 again, using the Aug. 14, 2003 earthquake as an example to determine the existence of a geometrical continuity of anomalies over a continental boundary, grids 22, 23, 28, 29, 30, 31 and 39 may be considered. The epicenter of the earthquake, shown with a star, is located in grid 31.

A wavelet analysis may be performed using Stanford University's Wavelab library and the University of Wisconsin's octave mathematical program. Table 1 shows wavelet parameters used for the analysis.

TABLE 1

Wavelet parameters of the numerical real wavelet transformation (RWT) used in experiment

| Function | RWT |
|---|---|
| Mother Wavelet | Gauss |
| Nvoice | 20 |
| Scale | 2 |
| Octave | 20 |
| Propagation Factor | $\frac{1}{2}$ |

The wavelet analysis may be performed over the original signal for the year 2003 for each grid. Data available from Jan. 1, 2003 to Oct. 31, 2003 may be used. FIGS. 5-11 highlight results of wavelet analyses for SLHF data. These figures contain three parts.

The first part shows a time-series for the original signal, a 30-day average for years 1998-2002, and 1 and 2 standard deviations. The second part is a graphical representation of the previously described characteristic vector, which shows the time of significant wavelet maxima. The depth of propagation is shaded on a gray scale to emphasize those maxima that propagate to finer scales. The third part shows a graphical representation of the wavelet coefficients. Contour lines may be added to increase readability and to stress the areas most likely to contain maxima lines. Table 2 shows information shared by FIGS. 5-11; Table 3 identifies the location and grid used in each of these figures to conduct the wavelet analysis.

TABLE 2

Common SLHF Data

| | |
|---|---|
| Earthquake Date | Aug. 14, 2003 |
| Earthquake Day | 226 |
| Wavelet Library | WaveLab |
| Function | RWT (X, 20, 2, 10) |
| Propagation Factor | $\frac{1}{2}$ |

TABLE 3

Location of Wavelet Analysis

Figure 5:
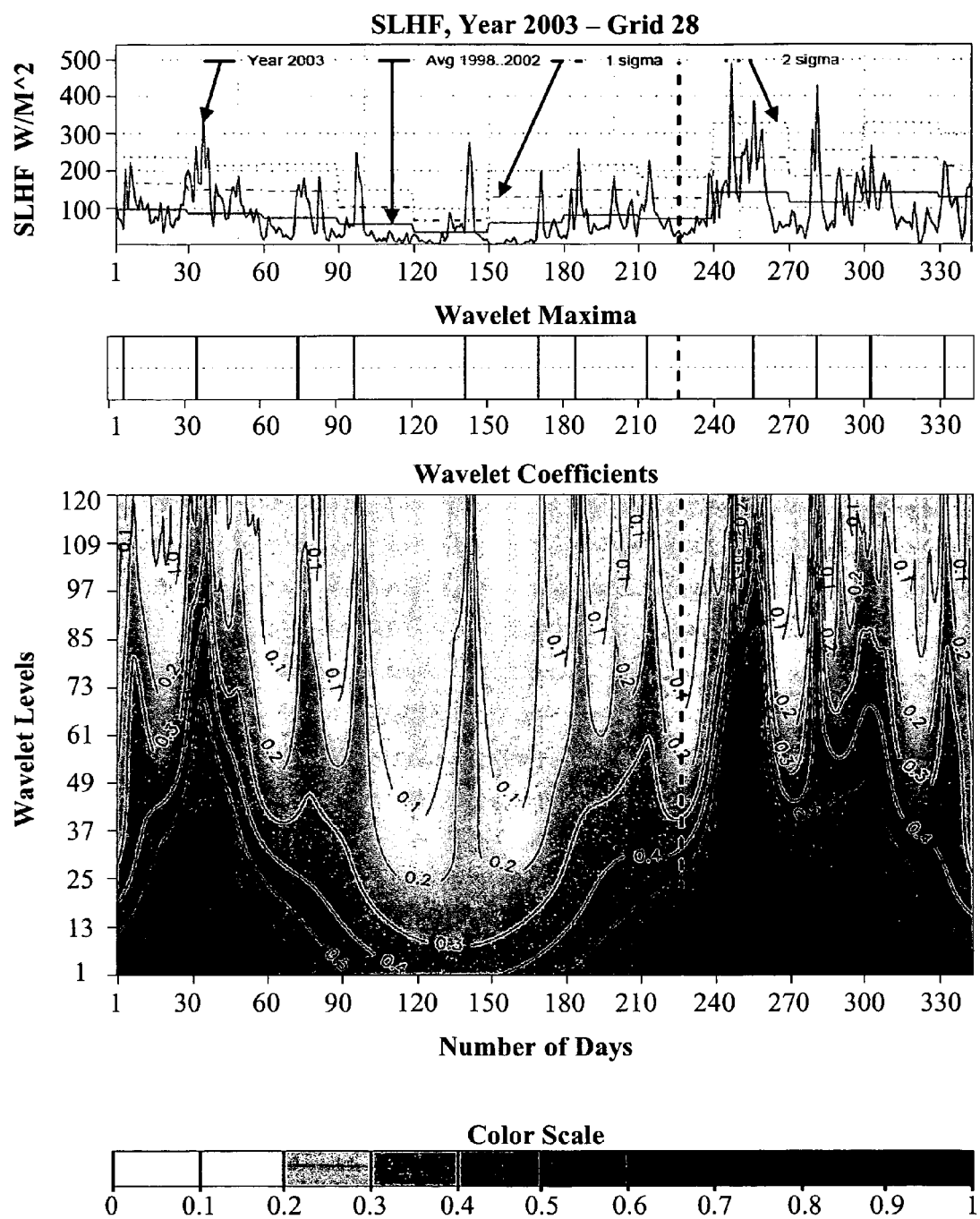
FIG. 5 shows wavelet analysis for SLHF data over Grid 28 for the year 2003.
Figure 6:
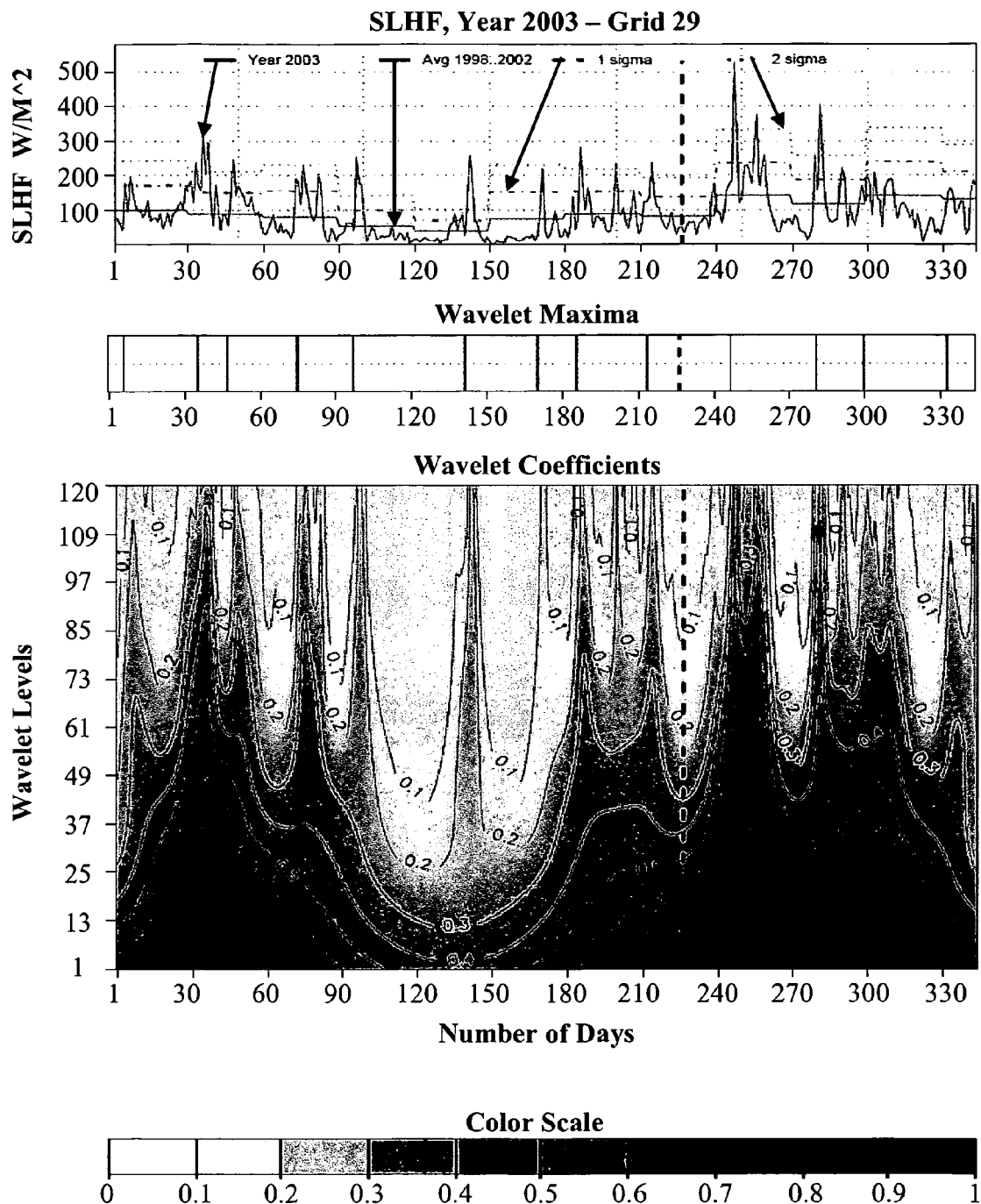
FIG. 6 shows wavelet analysis for SLHF data over Grid 29 for the year 2003.
Figure 7:
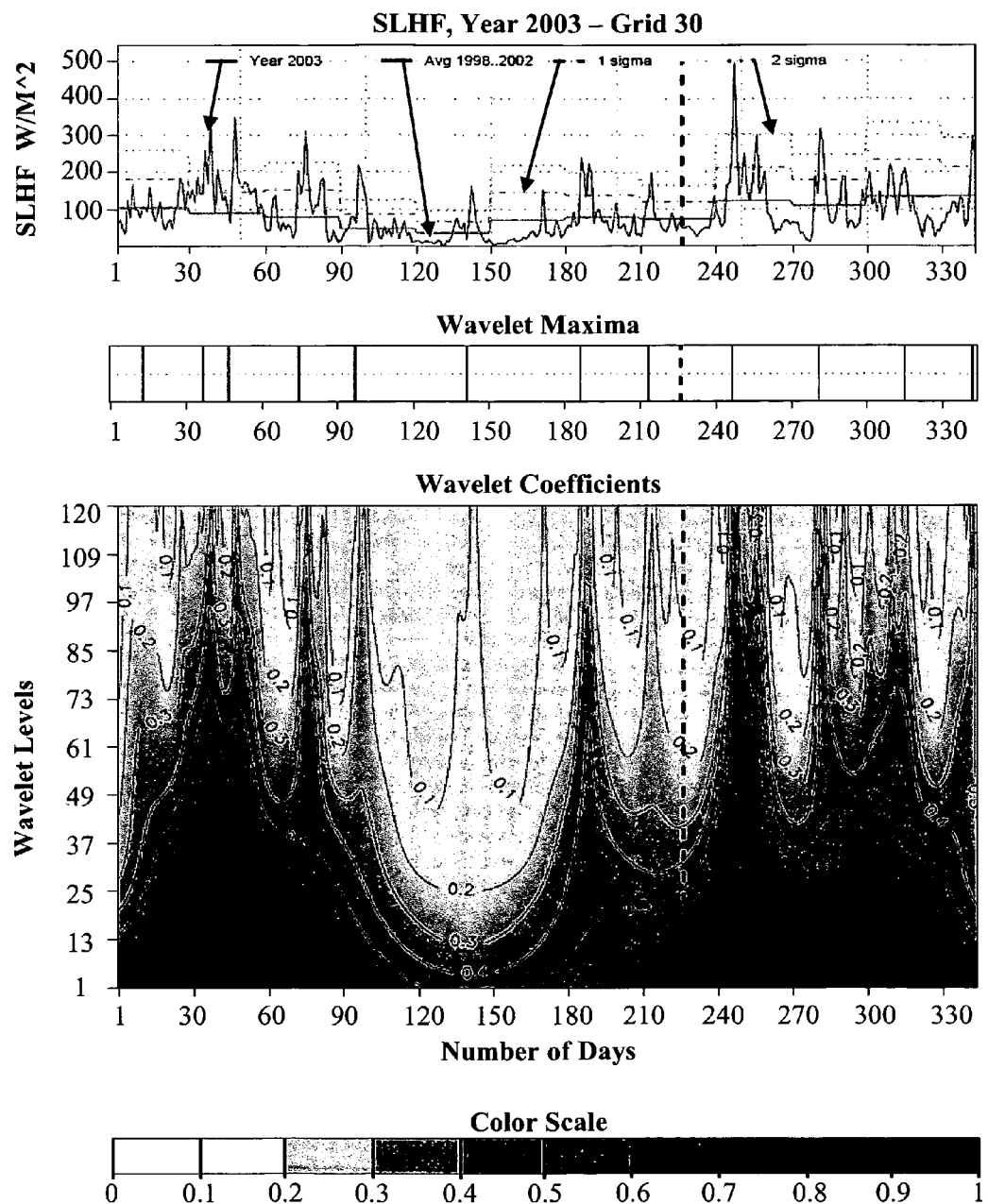
FIG. 7 shows wavelet analysis for SLHF data over Grid 30 for the year 2003.
Figure 8:
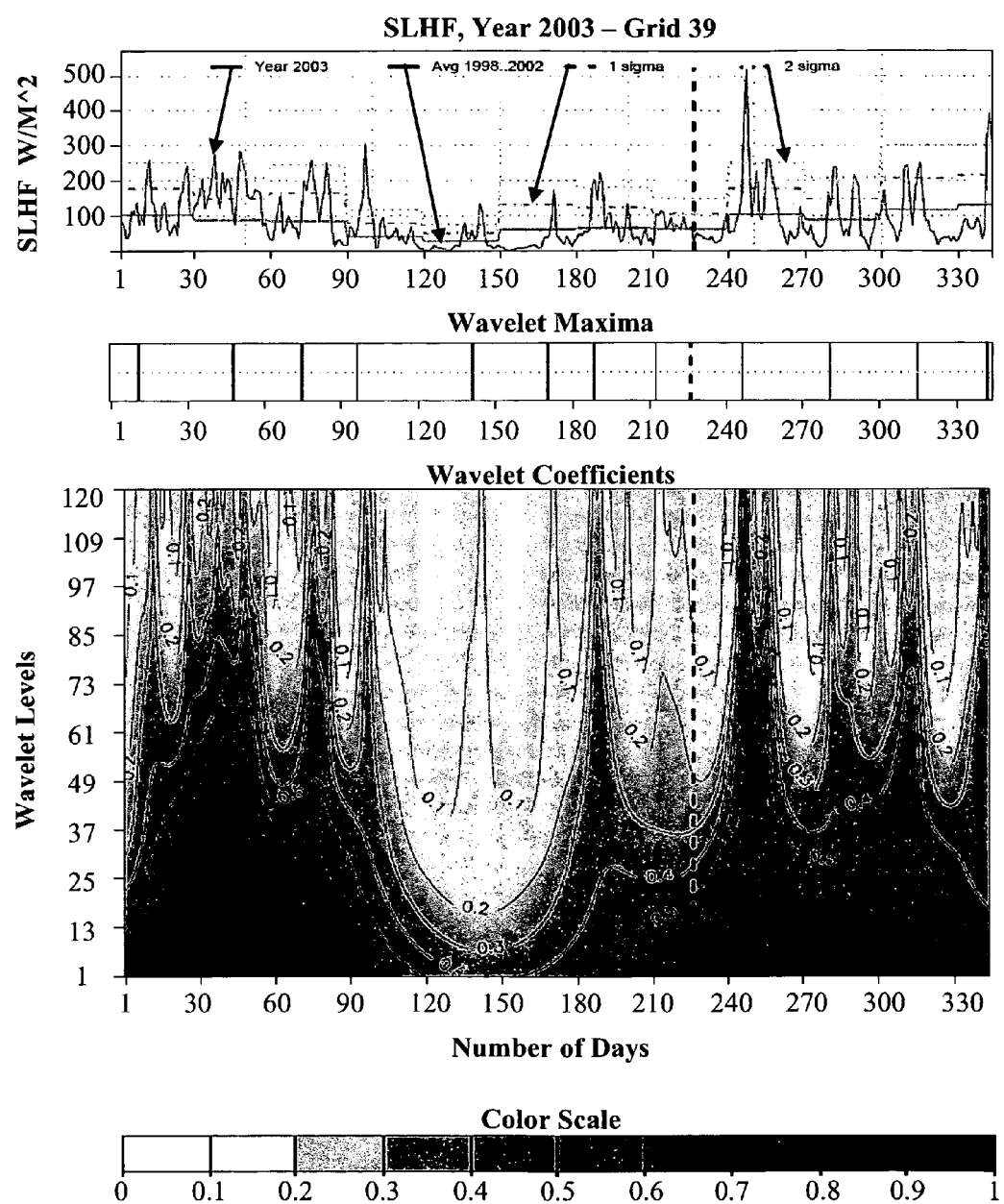
FIG. 8 shows wavelet analysis for SLHF data over Grid 39 for the year 2003.
Figure 9:
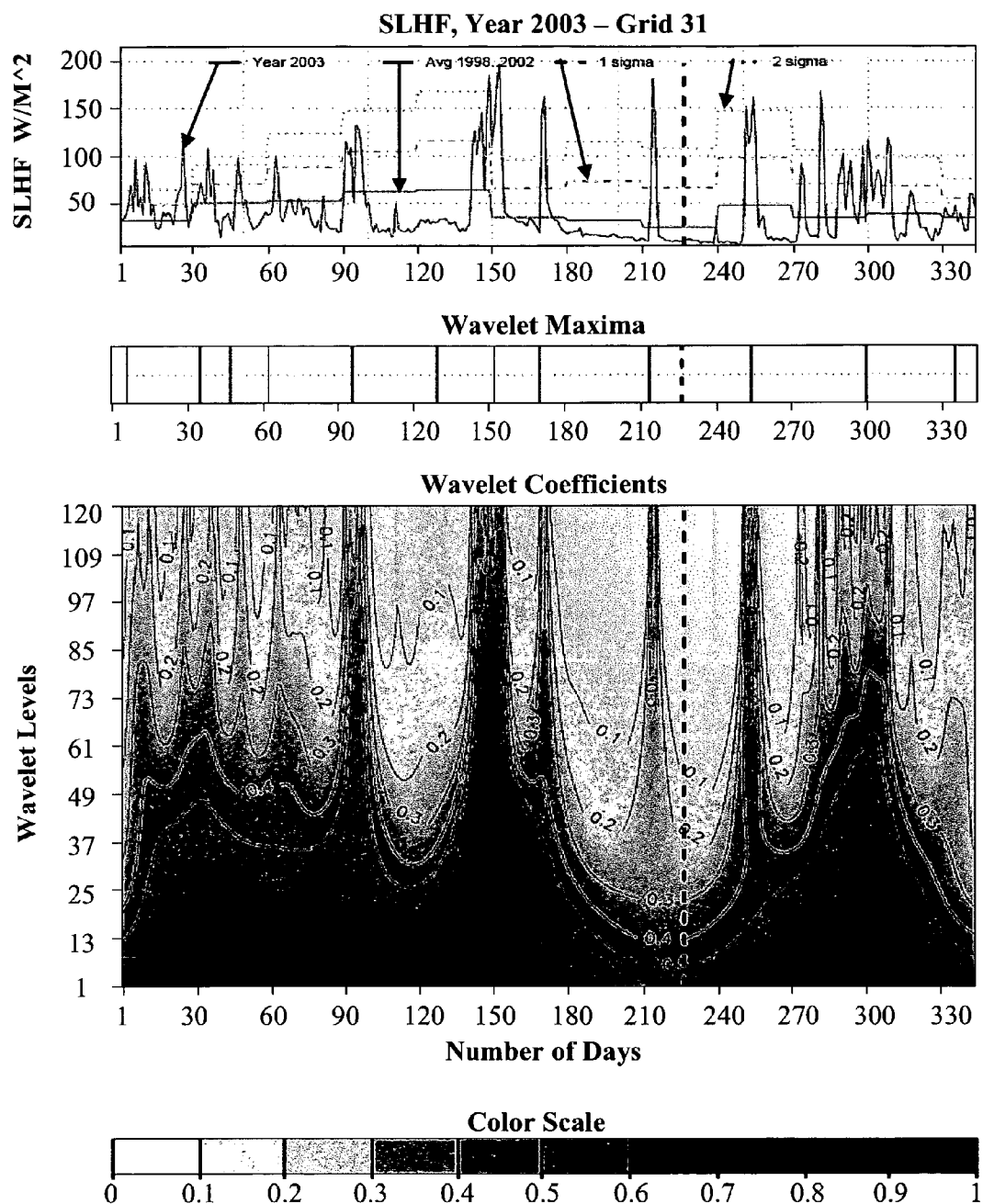
FIG. 9 shows wavelet analysis for SLHF data over Grid 31 for the year 2003.
Figure 10:
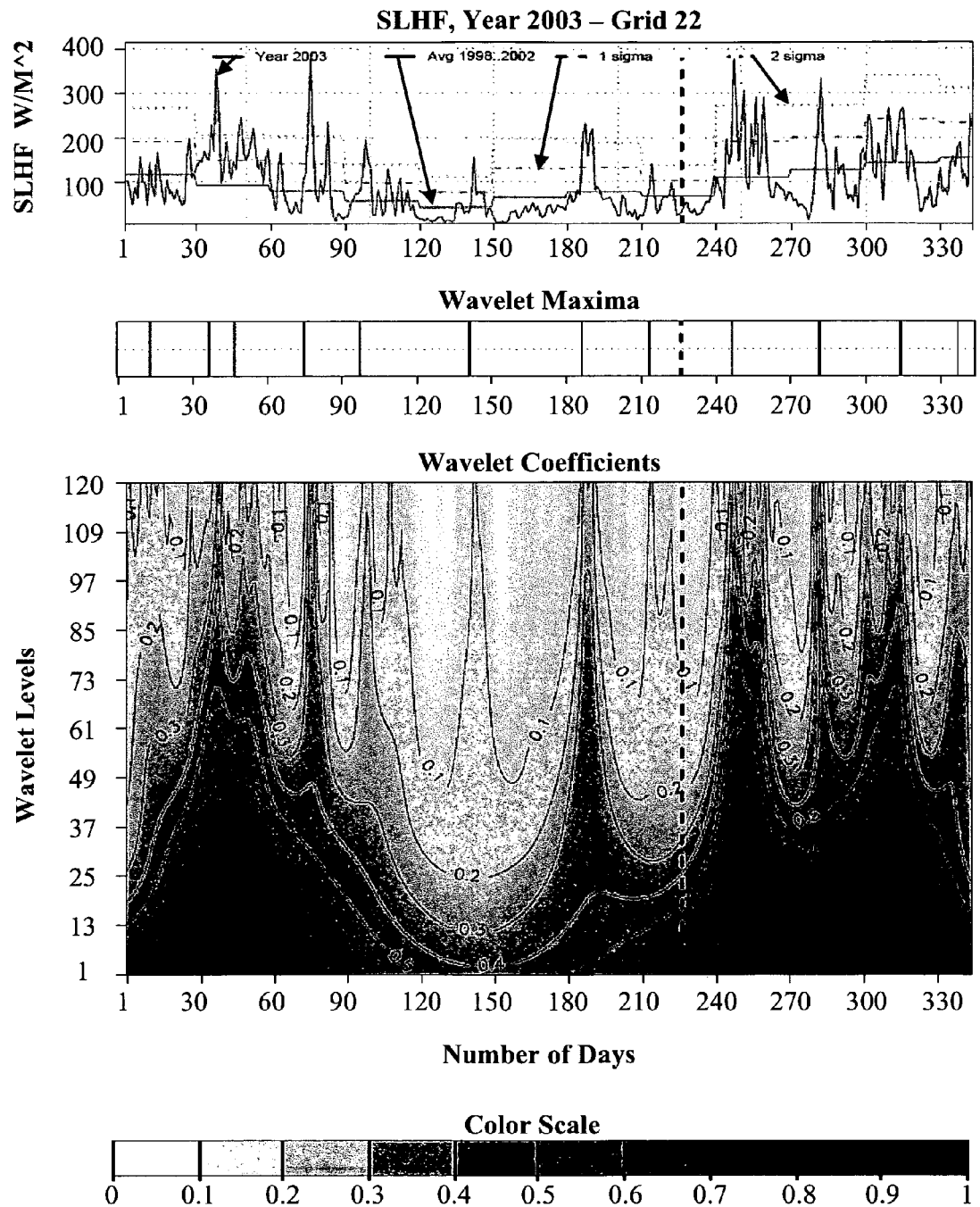
FIG. 10 shows wavelet analysis for SLHF data over Grid 22 for the year 2003.
Figure 11:
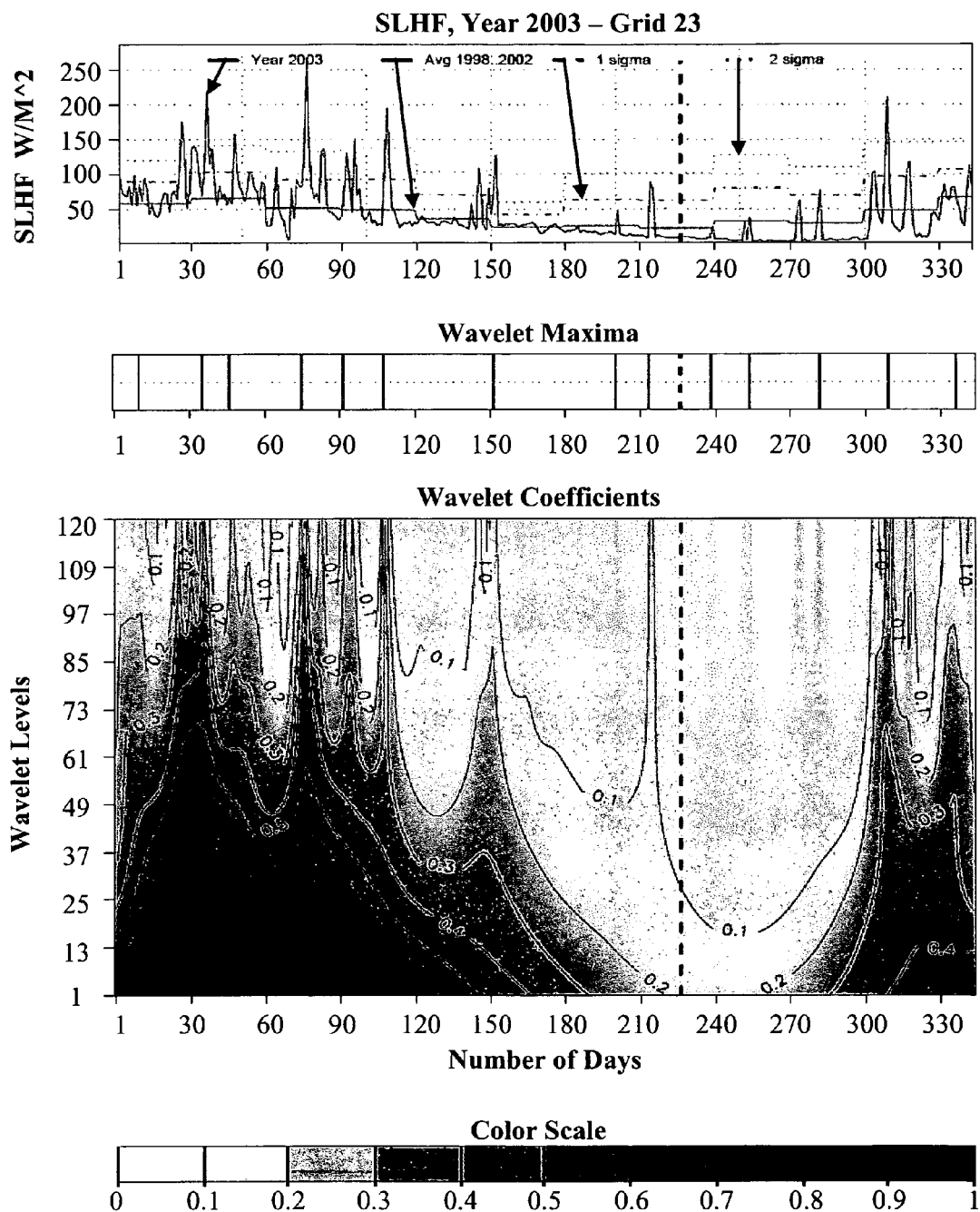
FIG. 11 shows wavelet analysis for SLHF data over Grid 23 for the year 2003.

| Figure | Location | Grid Number |
|---|---|---|
| FIG. 5 | 39.05° N, 15° E | 28 |
| FIG. 6 | 39.05° N, 16.88° E | 29 |
| FIG. 7 | 39.05° N, 18.75° E | 30 |
| FIG. 8 | 40.95° N, 18.75° E | 39 |
| FIG. 9 | 39.05° N, 20.62° E | 31 |
| FIG. 10 | 37.14° N, 20.62° E | 22 |
| FIG. 11 | 37.14° N, 22.5° E | 23 |

A wavelet transformation for the epicentral region may be shown as in FIG. 9. It is possible to notice the sharp SLHF peak, which occurs about two weeks prior to the earthquake, because the peak appears well above two sigma (as represented by a dashed line).

Both FIGS. 12 and 13 show the analysis of spatial and temporal continuity. More specifically, FIG. 12 shows the local maxima of a wavelet analysis where the X axis is the grid number and the Y axis is time expressed in days. FIG. 13 shows possible paths computed over the results of the wavelet analysis. It is possible to notice that there exists only one path that satisfies spatial and temporal constraints. It is also possible to notice that it manifests about 12 days prior to the earthquake event. This signal may be considered as a strong precursor of the earthquake. The parameters used to compute the spatial and temporal continuity are given in Table 4.

TABLE 4

Continuity parameters used in the experiments

| | |
|---|---|
| Max Discontinuity | 20 Days |
| Min Length | 5 Grids |
| Penalization Discontinuity | 0.5 |
| Tolerance | 5% |

Figure 14:
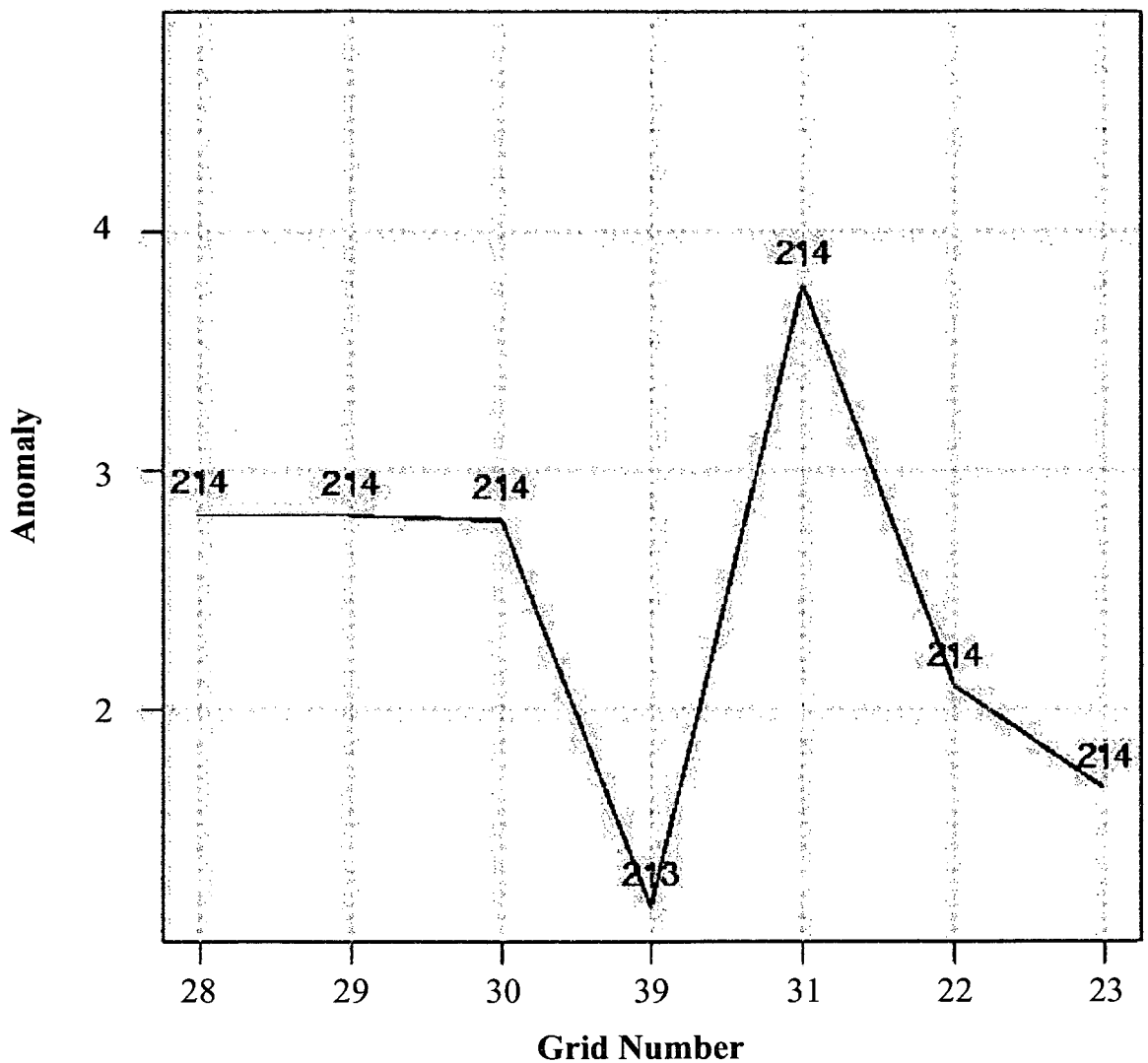
FIG. 14 shows anomalies and time of occurrence for identified signals at each grid location.

FIG. 14 shows an SLHF anomaly for the only significant signal. Values on the graph indicate the day when the anomaly was registered. These values are concentrated around day 214, corresponding to Aug. 2, 2003, just 12 days prior to the earthquake event. The SLHF anomaly over the epicenter was also found to be a maximum of 12 days prior to the main earthquake event.

In sum, the lessons learned from this example may be used to help detect earthquakes. The use of 1-D real continuous wavelet transformation combined with the studies of spatial and temporal continuity of an anomaly over a continental boundary has discriminated a single signal among the ones found. This signal occurred 12 days prior to the earthquake, and may be considered as a strong precursor. Such anomalous behavior of SLHF may be directly associated with the occurrence of coastal earthquakes.

2. Smoothing Format

To exemplify how this format can use SLHF data to show a detectable anomaly prior to an earthquake, the Aug. 14, 2003 (having a magnitude of 6.7) and Mar. 1, 2004 (having a magnitude of 5.7) earthquakes were considered. Experiments may be carried out over the stronger earthquake and validated using the same grid path over the weaker earthquake. To determine the existence of a geometrical continuity of anomalies over a continental boundary, the grid path covering grids 32, 33, 37, 38, 39, 40, 41 and 49 may be used. As shown in FIG. 15, the epicenter of each earthquake, denoted with a star, is respectively shown in grids 41 and 33. This figure also shows the location of the plate boundary, fault lines and their type (e.g., extensional, compressional, and transformation).

Wavelet analysis may be performed using 365 SLHF data points, from Mar. 30, 2003 to Mar. 28, 2004, for each of the grids in the grid path. The results of the wavelet analysis may be shown in FIGS. 17 to 24. Table 5 shows the parameters used in the analysis.

TABLE 5

Wavelet parameters of the numerical RWT used in the experiments

| | |
|---|---|
| Function | RWT |
| Mother Wavelet | Sombrero |
| Nvoice | 10 |
| Scale | 10 |
| Octave | 2 |
| Propagation Factor | $\frac{1}{2}$ |

Each of these figures may contain three parts:

1. The first part may show the time-series for the original signal, the 30-days average for the previous five years 1998-2002, and the 1 and 2 sigma for the 30-days average.

2. The second part may be a graphical representation of the characteristic vector as described in the previous wavelet transformation section, which shows the time when significant wavelet maxima may be detected. The gray scale generally indicates the propagation depth to emphasize those maxima that propagate to finer scales.

3. The third part may include a graphical representation of the wavelet coefficients, and corresponding maxima lines. It is possible to notice how the maxima lines converge to lines indicated in the previous part.

Table 2 shows information shared by FIGS. 17-24; Table 3 identifies the location and grid used in each of these figures to conduct the wavelet analysis.

TABLE 6

Common SLHF Data

| | |
|---|---|
| Earthquake Dates | Aug. 14, 2003 and Mar. 1, 2004 |
| Data Analyzed | Mar. 30, 2003-Mar. 28, 2004 |
| Wavelet Library | WaveLab |
| Function RWT | (X, 10, Sombrero, 2, 10) |
| Propagation Factor | $\frac{1}{2}$ |

TABLE 7

Location of Wavelet Analysis

Figure 17:
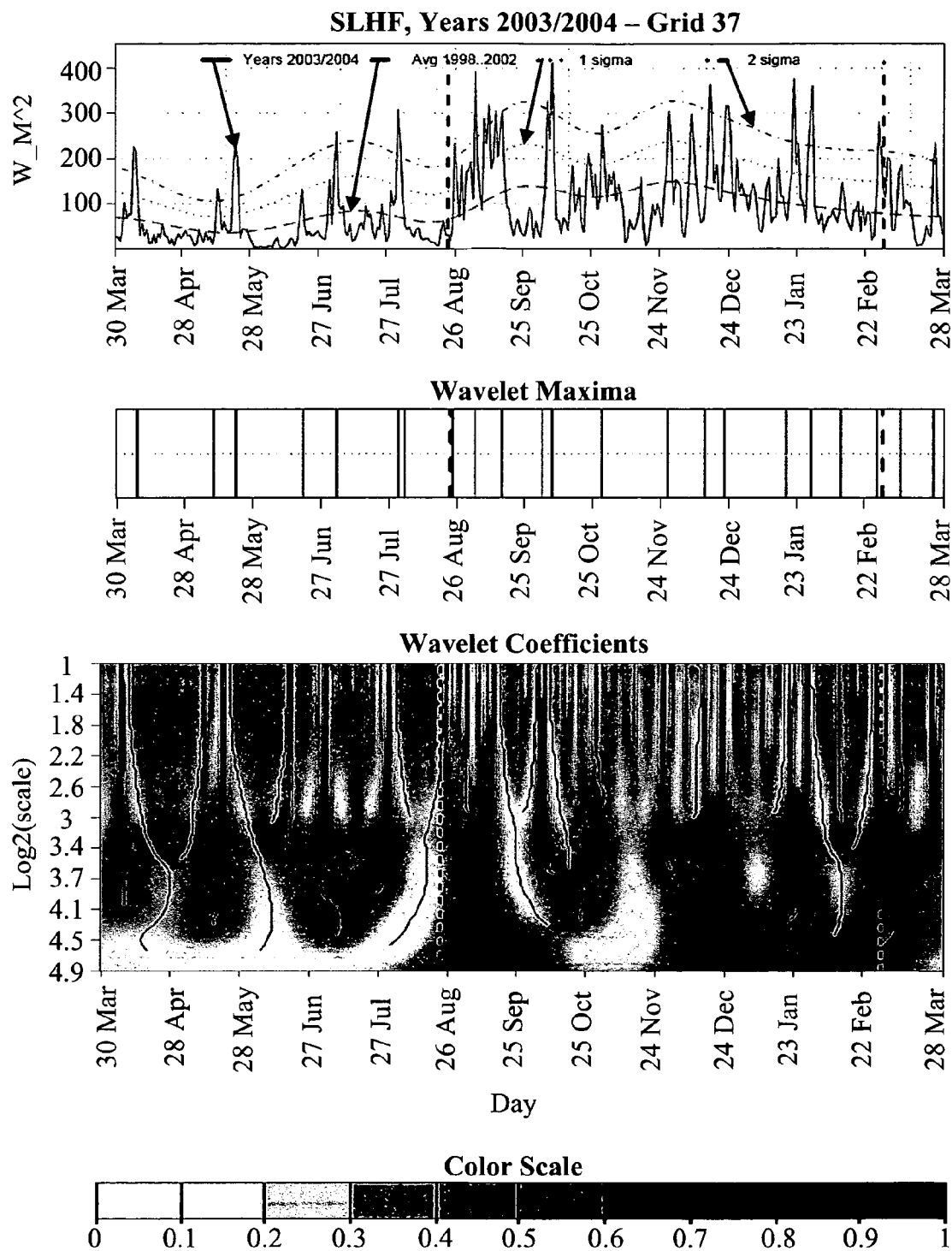
FIG. 17 shows wavelet analysis for SLHF data over Grid 37 from Mar. 30, 2003 to Mar. 28, 2004.
Figure 18:
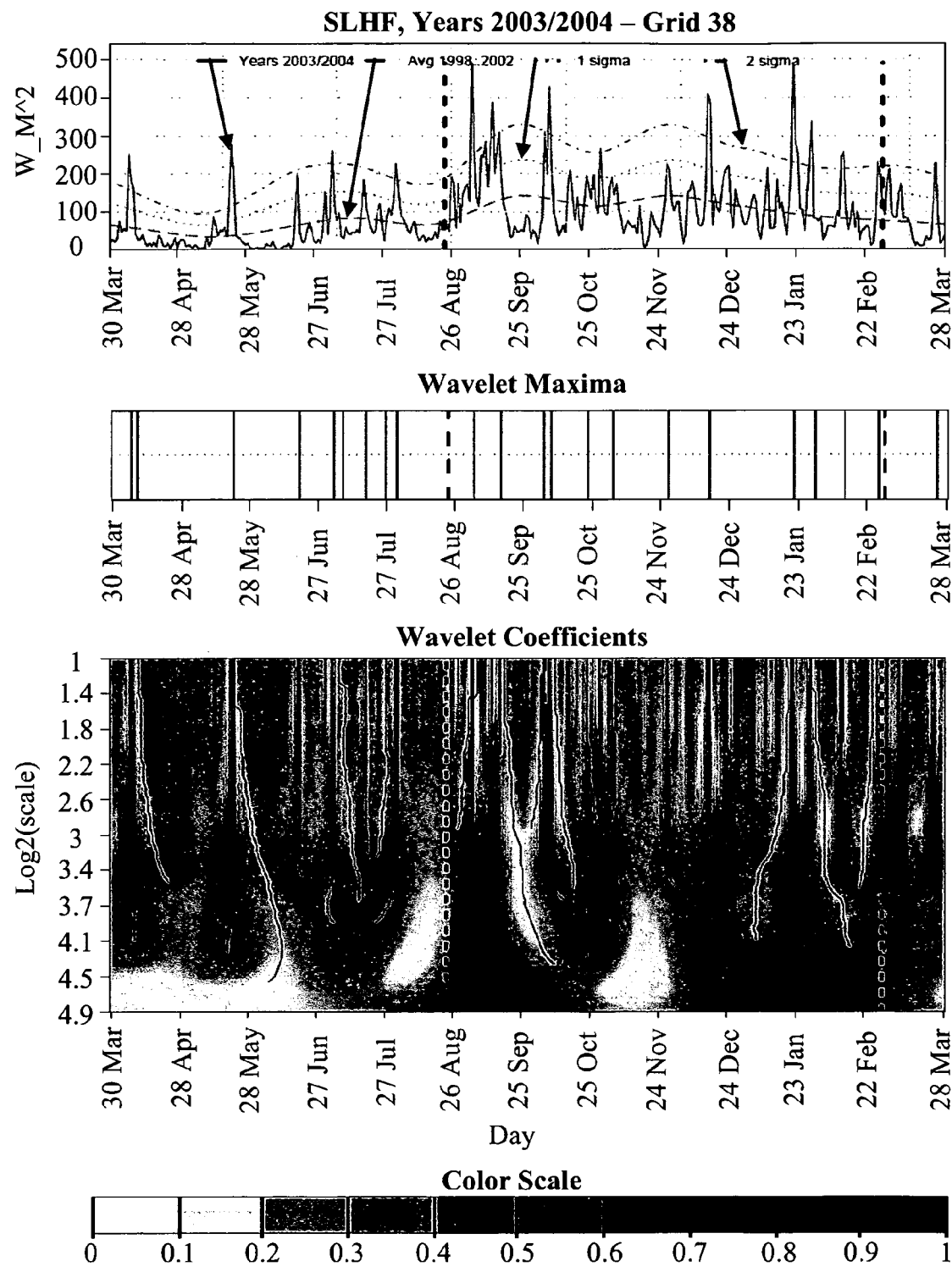
FIG. 18 shows wavelet analysis for SLHF data over Grid 38 from Mar. 30, 2003 to Mar. 28, 2004.
Figure 19:
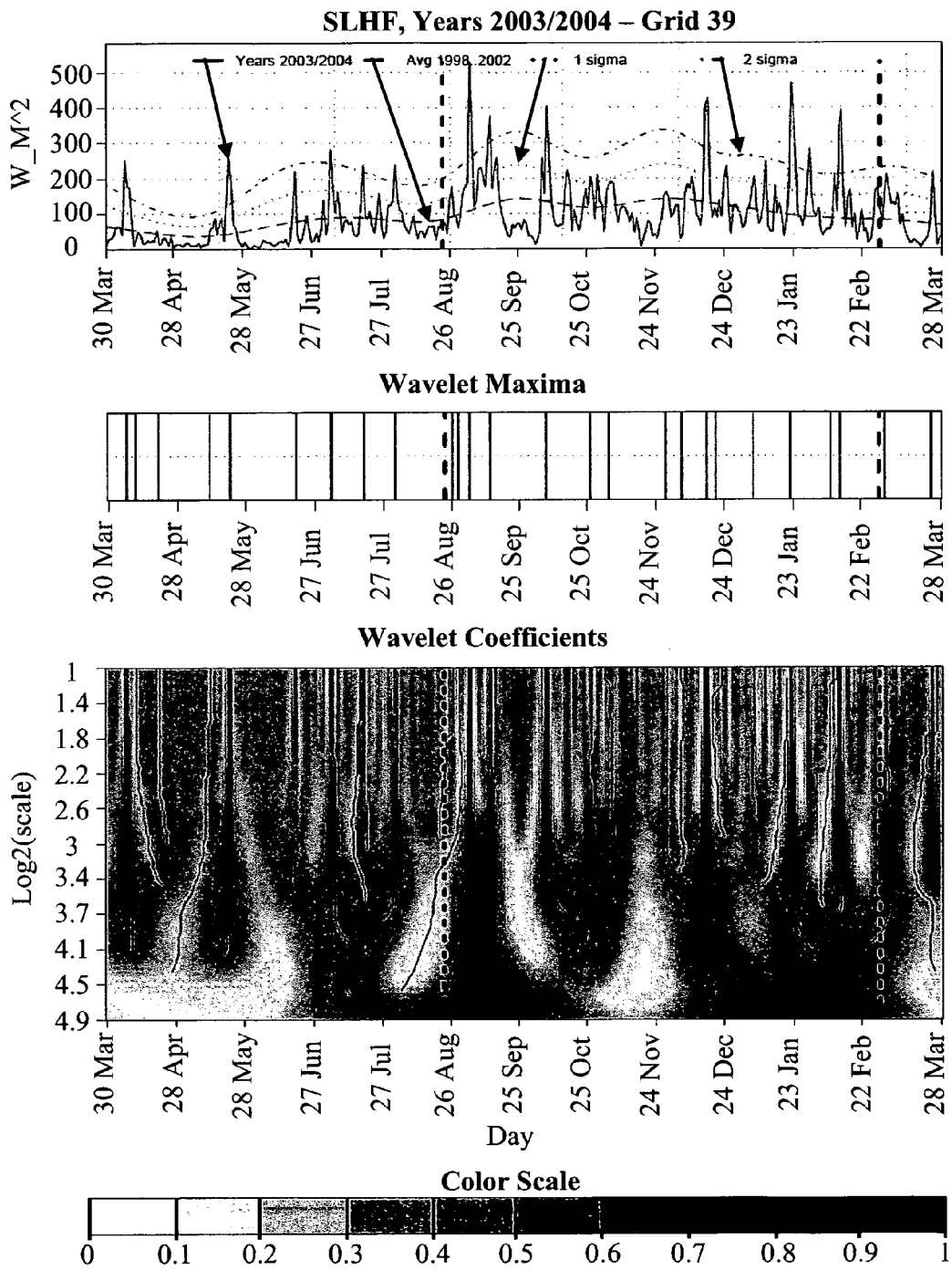
FIG. 19 shows wavelet analysis for SLHF data over Grid 39 from Mar. 30, 2003 to Mar. 28, 2004.
Figure 20:
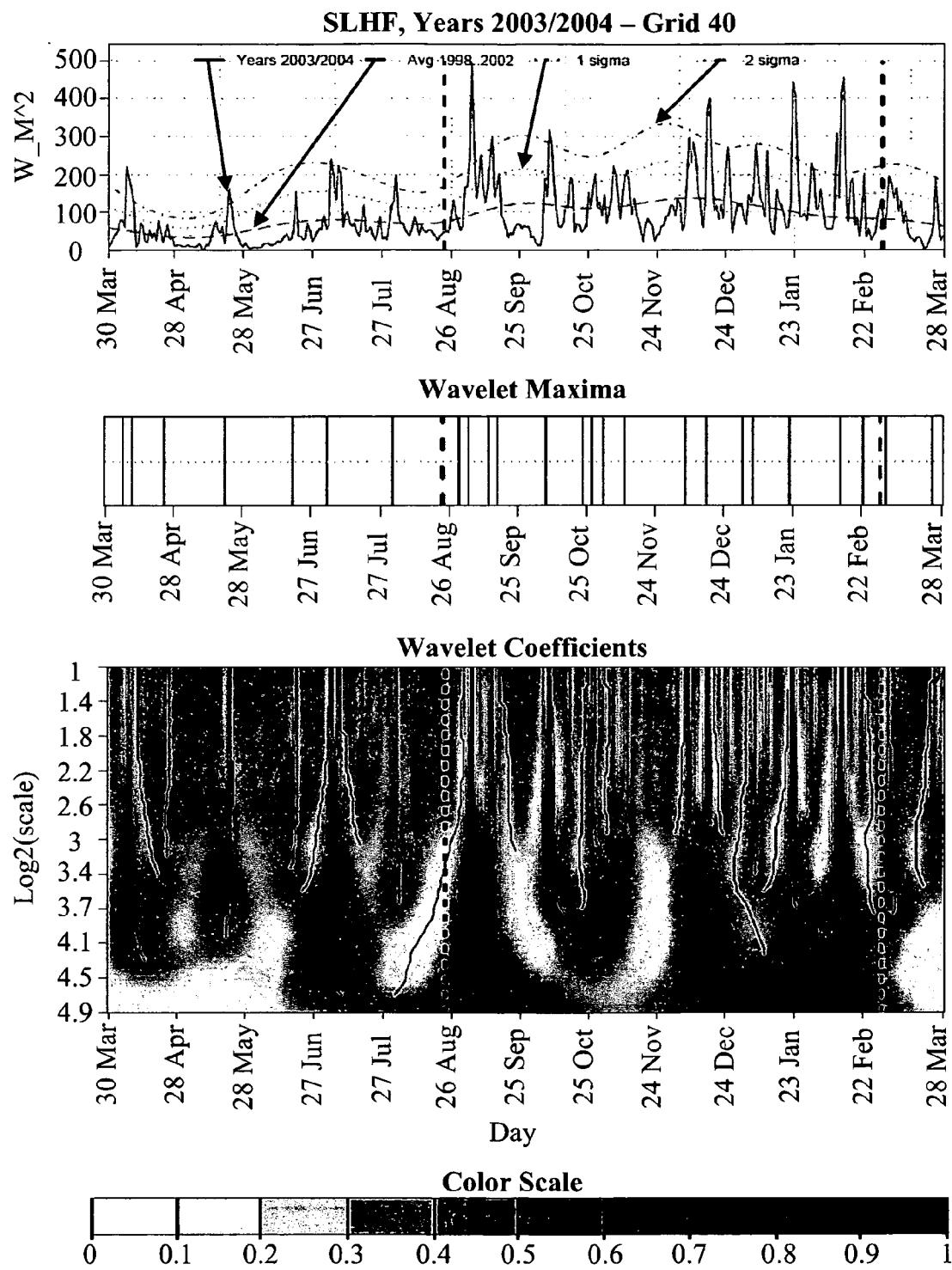
FIG. 20 shows wavelet analysis for SLHF data over Grid 40 from Mar. 30, 2003 to Mar. 28, 2004.
Figure 21:
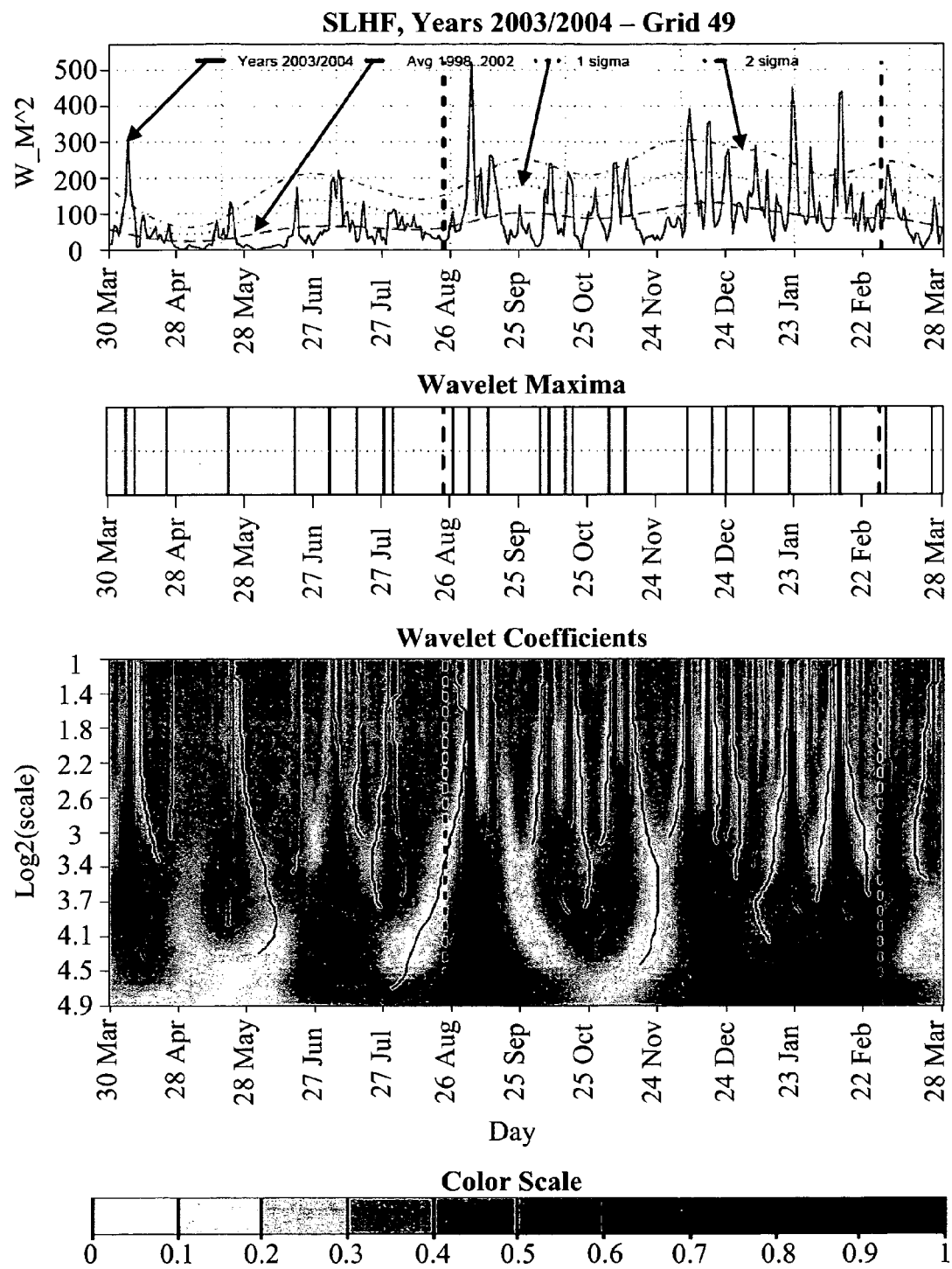
FIG. 21 shows wavelet analysis for SLHF data over Grid 49 from Mar. 30, 2003 to Mar. 28, 2004.
Figure 22:
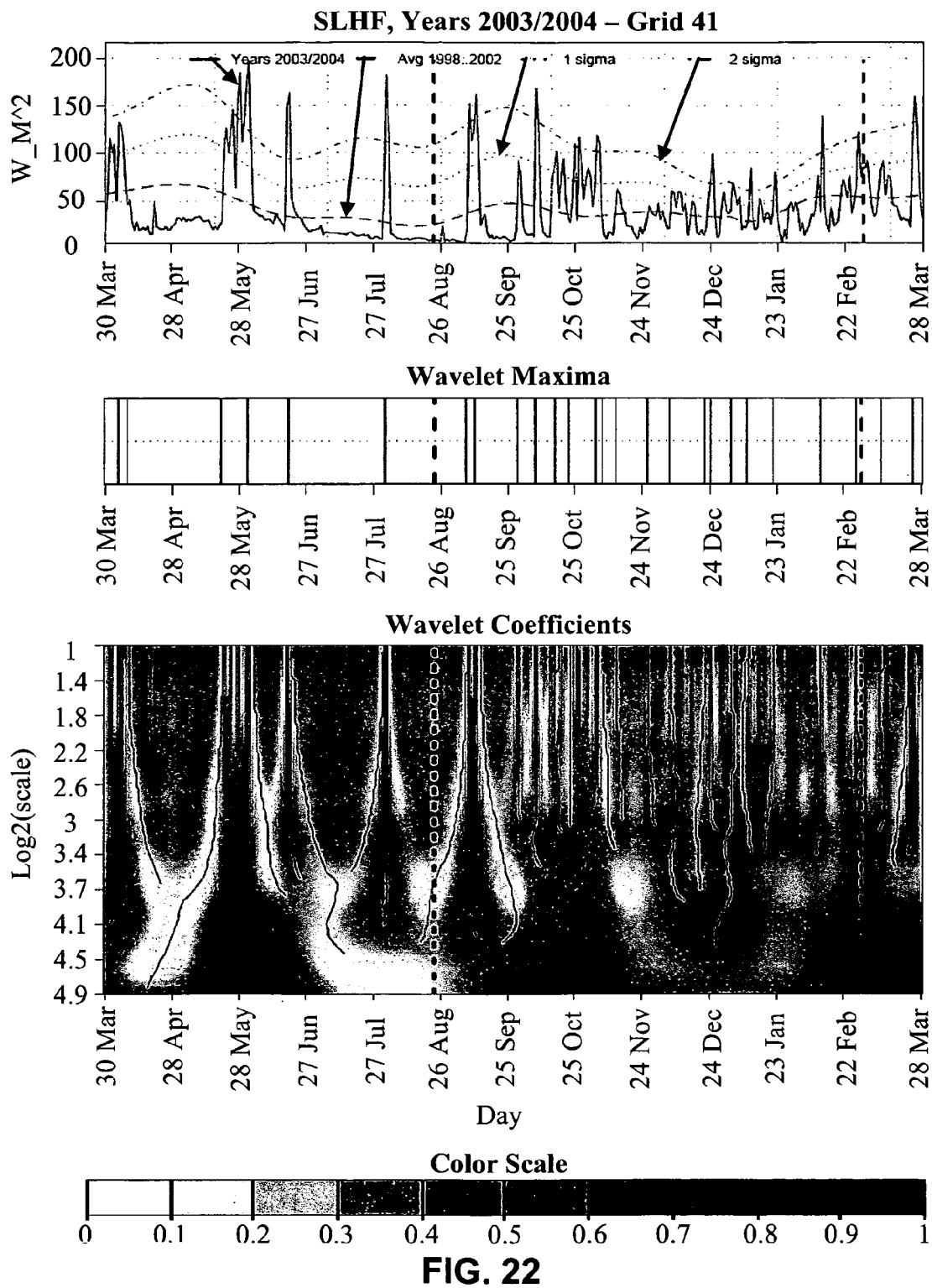
FIG. 22 shows wavelet analysis for SLHF data over Grid 41 from Mar. 30, 2003 to Mar. 28, 2004.
Figure 23:
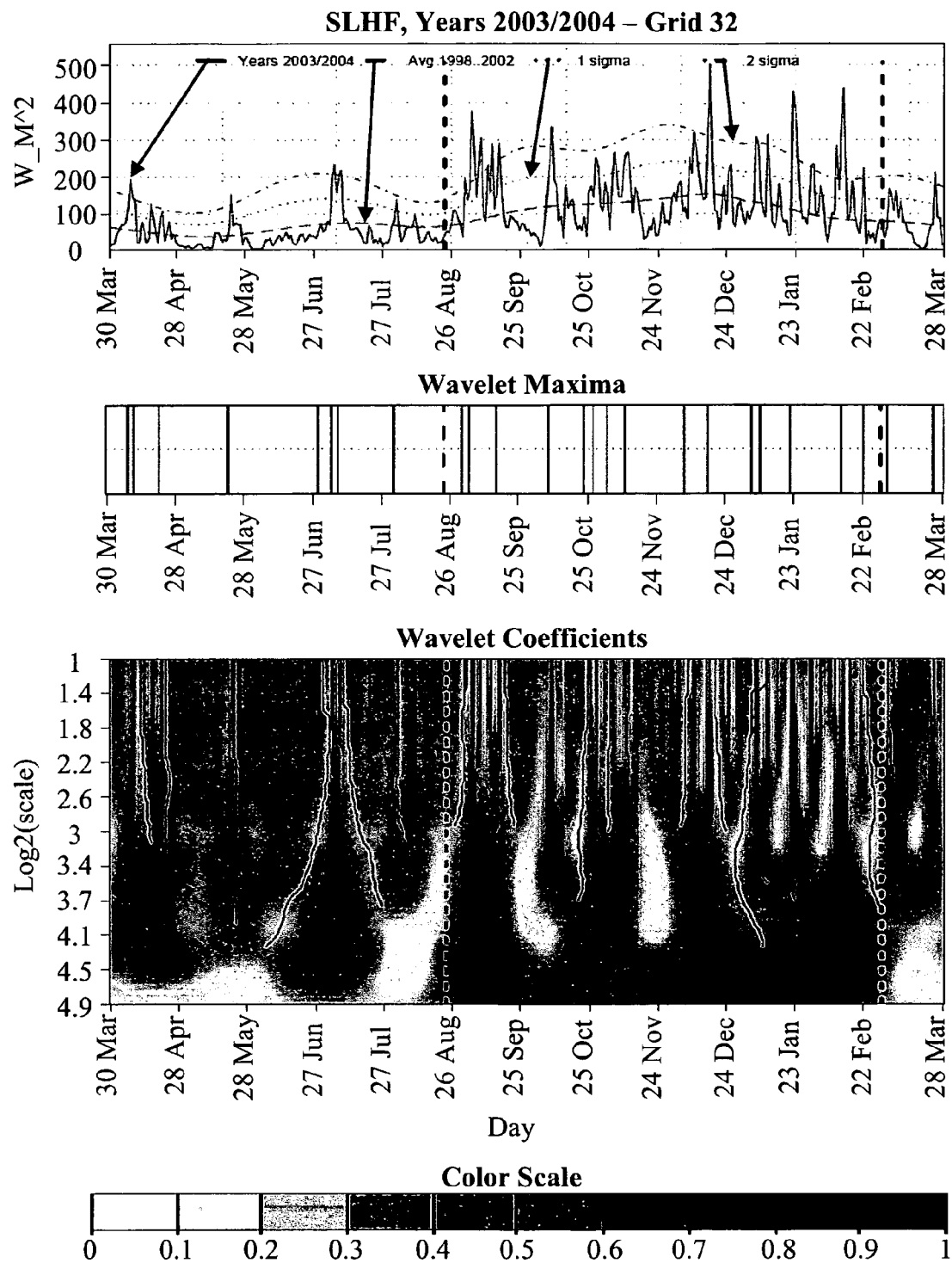
FIG. 23 shows wavelet analysis for SLHF data over Grid 32 from Mar. 30, 2003 to Mar. 28, 2004.
Figure 24:
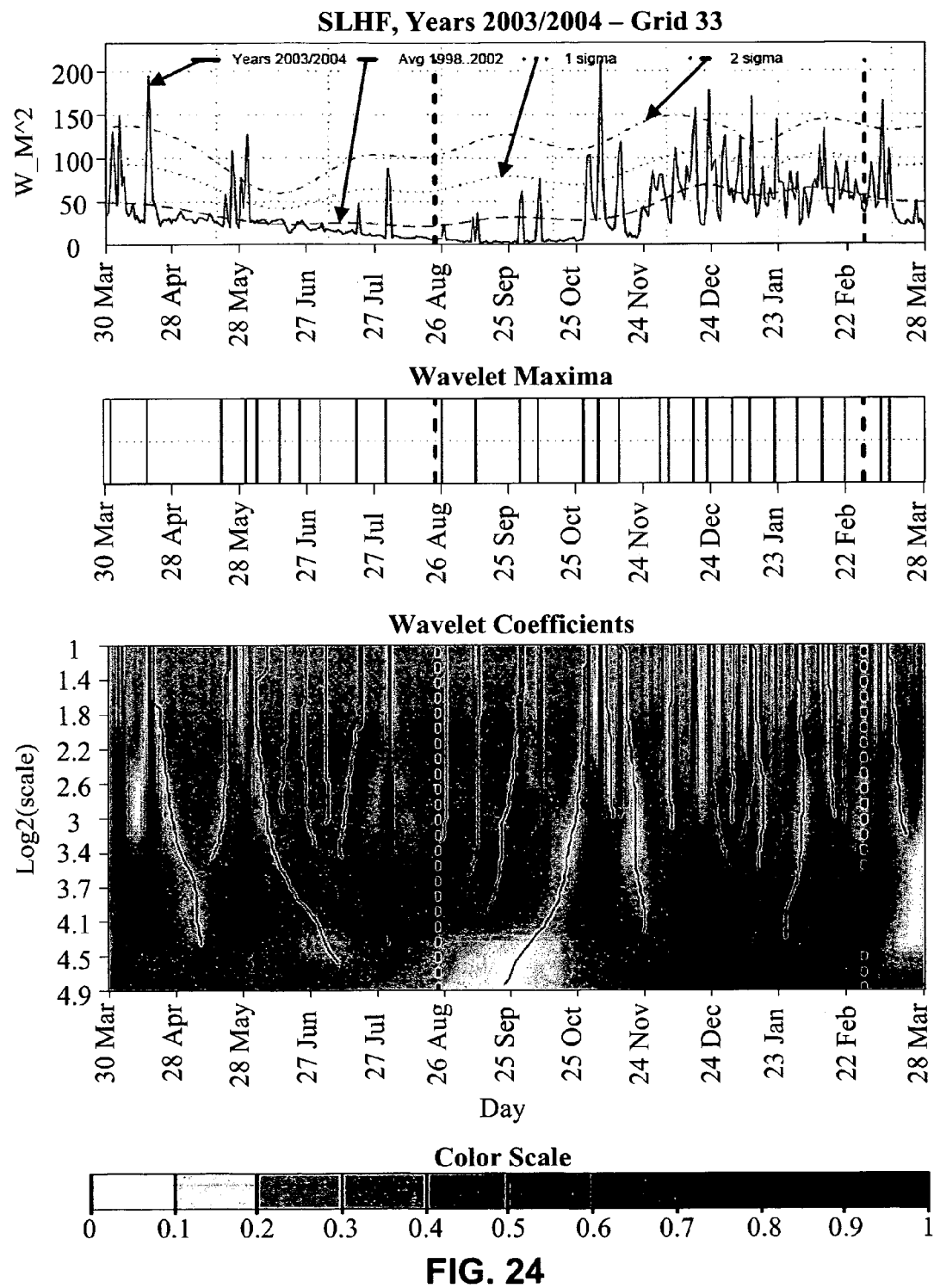
FIG. 24 shows wavelet analysis for SLHF data over Grid 33 from Mar. 30, 2003 to Mar. 28, 2004.

| Figure | Location | Grid Number |
|---|---|---|
| FIG. 17 | 39.05° N, 13.12° E | 37 |
| FIG. 18 | 39.05° N, 15° E | 38 |
| FIG. 19 | 39.05° N, 16.88° E | 39 |
| FIG. 20 | 39.05° N, 18.75° E | 40 |
| FIG. 21 | 40.95° N, 18.75° E | 49 |
| FIG. 22 | 39.05° N, 20.62° E | 41 |
| FIG. 23 | 37.14° N, 20.62° E | 32 |
| FIG. 24 | 37.14° N, 22.5° E | 33 |

FIG. 22 shows the wavelet transformation for the epicentral region of the 2003 earthquake. A sharp SLHF peak well above two sigma (dashed line) is seen about two weeks prior to the earthquake. Similarly, FIG. 24 shows the wavelet transformation for the epicentral region of the 2004 earthquake. A sharp SLHF peak above one sigma (dotted line) is also seen about two weeks prior to the earthquake. The lesser intensity of this peak is likely due to the smaller magnitude of the 2004 earthquake.

Figure 25:
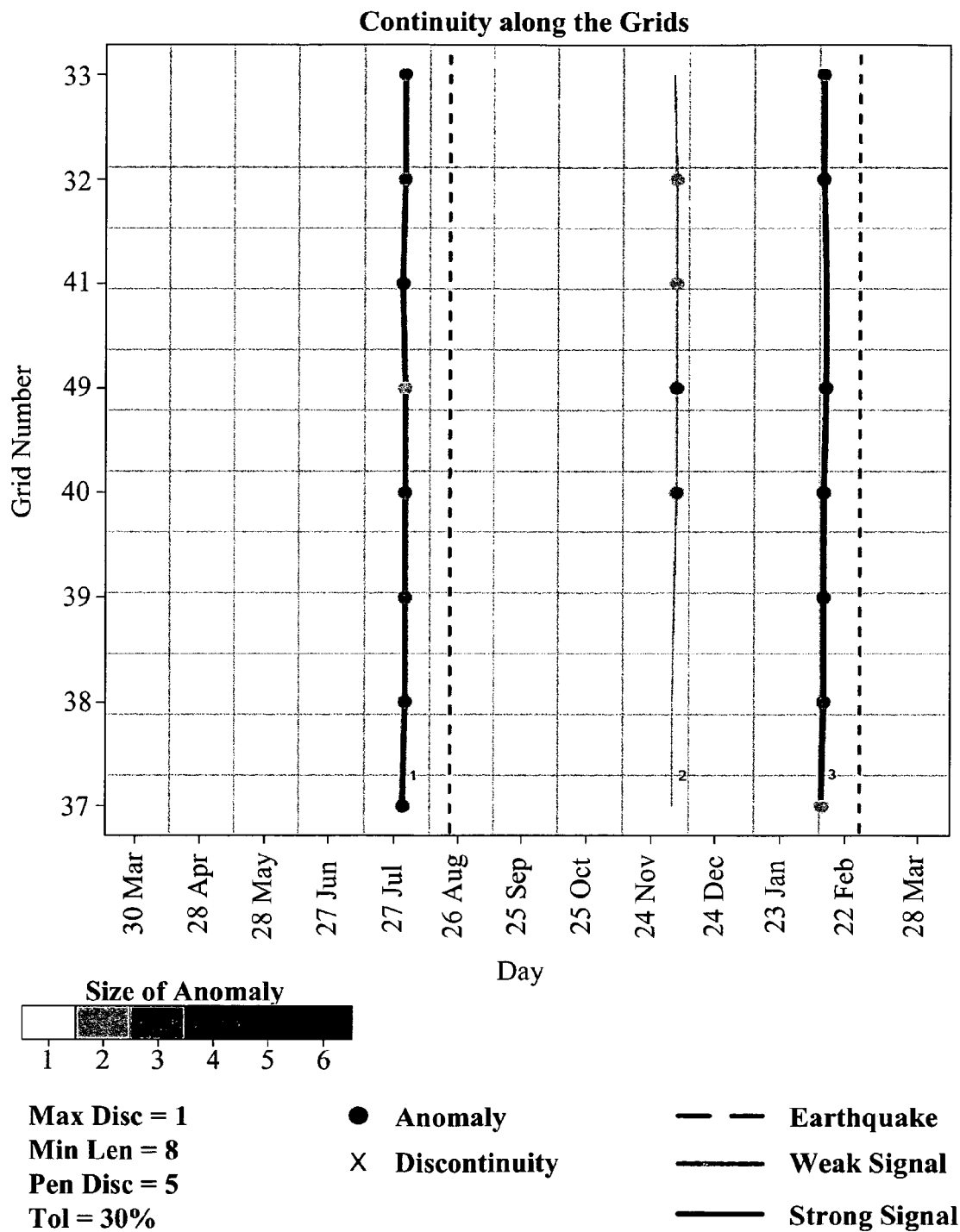
FIG. 25 shows results of possible paths of wavelet maxima computed in wavelet transformations.

Referring to FIG. 25, the analysis of spatial and temporal continuity illustrates significant paths generated using the results of the wavelet analysis, under specified time and space constraints. The x-axis represents time expressed in days; the y-axis represents the grid of the grid path. The strength of the anomaly is shaded.

Out of a 365-day period, only three continuous paths may be found that satisfy space and time constraints. One of these paths occurred about 12 days prior to the earthquake of Aug. 14, 2003. Another occurred about 14 days prior to the Mar. 1, 2004 earthquake. Although the third signal may satisfy the given constraints of space and time continuity, it appears to be weaker than the former two. One reason is that the detected singularities for the third signal are not very strong. However, both the stronger signals can be considered as strong precursors of the two earthquakes. Table 6 provides the parameters used to compute spatial and time continuity.

TABLE 6

Continuity parameters used in the experiments

| Max Discontinuity | 1 Day |
|---|---|
| Min Length | 8 Grids |
| PC | 2 |
| Tolerance | 20% |

Figure 26:
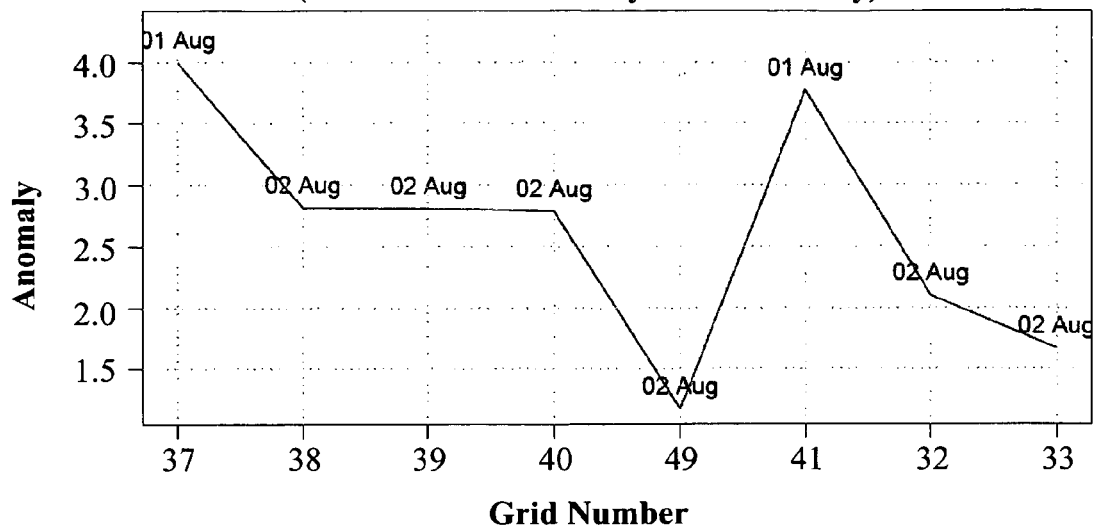
FIG. 26 shows the size of anomalies and their time of occurrence for the two precursor signals of the Aug. 14, 2003 earthquake (signal 1) and Mar. 1, 2004 earthquake (signal 3).

FIG. 26 shows SLHF anomalies for the two significant signals. The values on the graph indicate the day when each of the anomalies was registered. It is possible to notice that in both cases, the largest anomaly occurred either at the epicenter (earthquake of Aug. 14, 2003) or in the grid immediately next to the epicenter (earthquake of Mar. 1, 2004).

In sum, the lessons learned from this example may be used to help detect earthquakes. The use of 1-D real continuous wavelet transformation combined with the studies of spatial and temporal continuity of the anomaly over the continental boundary have shown SLHF anomalies as earthquake precursors. For both earthquakes, the observed precursory signals are seen about two weeks prior to the main events. The precursory signals associated with the earthquake events may follow a continuity in time and space, which can be used to discriminate other signals due to different weather and atmospheric processes.

The foregoing descriptions of the preferred embodiments of the present invention have been presented for purposes of illustration and description. They are not intended to be exhaustive or to limit the invention to the precise forms disclosed, and obviously many modifications and variations are possible in light of the above teaching without departing from the scope of this invention and its broader aspects. The illustrated embodiments were chosen and described in order to best explain the principles of the invention and its practical application to thereby enable others skilled in the art to best utilize the invention in various embodiments and with various modifications as are suited to the particular use contemplated. For example, one skilled in the art will recognize that the present invention may be used in to detect seismic activity on Earth and planetary bodies, such as the Earth's moon.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

What is claimed is:

1. A method for identifying earthquake precursory signals comprising the steps of:
    a. selecting at least one grid to generate a grid path,
    b. analyzing a time-series on said at least one grid using wavelet transformation,
    c. identifying at least one local wavelet maximum for each scale of said wavelet transformation,
    d. generating a sequence of said at least one wavelet maximum,
    e. identifying at least one singularity using said sequence,
    f. measuring geometrical space and time continuity of said at least one singularity along said grid path,
    g. identifying at least one anomaly, and
    h. detecting earthquake by using said identified anomaly.

2. A method according to claim 1, further including the step of propagating at least one maximum line to reduce numerical errors.

3. A method according to claim 1, wherein said method employs a one-dimensional real continuous wavelet transformation.

4. A method according to claim 1, wherein said at least one grid is selected using the tectonics of a region, including at least one of the following:
    a. a two-dimensional space having dimensions width and height,
    b. a two-dimensional space having dimensions longitude and latitude,
    c. at least one evolutionary algorithm,
    d. heuristics,
    e. at least one continental boundary,
    f. at least one fault line, and
    g. SLHF measurements.

5. A method according to claim 1, wherein said grid path is evaluated using
    a. at least one criterion, including:
        i. at least one maximum length,
        ii. at least one minimum spread, and
        iii. at least one maximum anomaly, and
    b. at least one tolerance.

6. A method according to claim 1, wherein the step of measuring geometrical space and time continuity further includes the step of introducing a discontinuity in space and/or time for compensating rounding errors in a wavelet transformation.

7. An earthquake detector comprising:
a. a grid selector, capable of selecting at least one grid to generate a grid path,
b. a wavelet transformation analyzer, capable of analyzing wavelet transformation in a time-series,
c. a local wavelet maximum identifier, capable of identifying at least one local wavelet maximum for each scale of said wavelet transformation,
d. a sequence generator, capable of generating a sequence of said at least one local wavelet maximum,
e. a singularity identifier, capable of identifying at least one singularity using said sequence,
f. a geometrical analyzer, capable of measuring space and time continuity of said at least one singularity along said grid path, and
g. an anomaly identifier.

8. An earthquake detector according to claim 7, further including a numerical errors reducer, capable of propagating at least one maximum line to reduce numerical errors.

9. An earthquake detector according to claim 7, wherein said wavelet transformation analyzer further uses a one-dimensional real continuous wavelet transformation to detect singularities in a time-series for a grid.

10. An earthquake detector according to claim 7, wherein said grid selector selects said at least one grid using the tectonics of a region, including at least one of the following factors:
a. a two-dimensional space having dimensions width and height,
b. a two-dimensional space having dimensions longitude and latitude,
c. evolutionary algorithms,
d. heuristics,
e. continental boundaries,
f. fault lines, and
g. SLHF measurements.

11. An earthquake detector according to claim 7, wherein said earthquake detector evaluates said grid path using:
a. at least one criterion, including:
i. at least one maximum length,
ii. at least one minimum spread
iii. and at least one maximum anomaly, and
b. at least one tolerance.

12. An earthquake detector according to claim 7, wherein said geometrical analyzer further introduces a discontinuity in space and/or time for compensating rounding errors in a wavelet transformation.

* * * * *